United States Patent
Destain et al.

(10) Patent No.: US 7,835,054 B2
(45) Date of Patent: Nov. 16, 2010

(54) OPTICAL ARCHITECTURE HAVING A ROTATING POLYGON FOR USE IN IMAGING SYSTEMS

(75) Inventors: Patrick Rene Destain, Plano, TX (US); Steven Edward Smith, Allen, TX (US)

(73) Assignee: Texas Instruments Incorporated, Dallas, TX (US)

(*) Notice: Subject to any disclaimer, the term of this patent is extended or adjusted under 35 U.S.C. 154(b) by 414 days.

(21) Appl. No.: 11/856,012

(22) Filed: Sep. 14, 2007

(65) Prior Publication Data

US 2009/0009842 A1 Jan. 8, 2009

Related U.S. Application Data

(60) Provisional application No. 60/947,618, filed on Jul. 2, 2007.

(51) Int. Cl.
*G02B 26/08* (2006.01)
(52) U.S. Cl. .................................. 359/209.1
(58) Field of Classification Search ............. 359/209.1, 359/211.1, 211.2
See application file for complete search history.

(56) References Cited

U.S. PATENT DOCUMENTS

| | | | |
|---|---|---|---|
| 4,715,697 A | 12/1987 | John et al. | |
| 4,918,583 A | 4/1990 | Kudo et al. | |
| 5,216,534 A * | 6/1993 | Boardman et al. | 359/209.1 |
| 5,347,433 A | 9/1994 | Sedlmayr et al. | |
| 5,410,370 A | 4/1995 | Janssen et al. | |
| 5,428,467 A * | 6/1995 | Schmidt | 349/7 |
| 6,644,814 B2 | 11/2003 | Ogawa et al. | |
| 6,935,749 B2 | 8/2005 | Kato et al. | |
| 7,419,269 B2 * | 9/2008 | Kojima | 353/84 |
| 2006/0098128 A1 | 5/2006 | Conner et al. | |

FOREIGN PATENT DOCUMENTS

WO WO-0079340 12/2000

* cited by examiner

*Primary Examiner*—Euncha P Cherry
(74) *Attorney, Agent, or Firm*—Charles A. Brill; Wade James Brady III; Frederick J. Telecky, Jr.

(57) ABSTRACT

An optical architecture comprises a refractive cylinder that is movable relative to the incident light. By moving the refractive cylinder, the output light from the refractive cylinder is capable of sweeping through a spatial angle. Examples of the optical architecture can be implemented in an imaging system, such as a display system, for sequentially illuminating the target, such as a light valve in a display system with a high brightness.

16 Claims, 12 Drawing Sheets

OPTICAL ARCHITECTURE HAVING A ROTATING POLYGON FOR USE IN IMAGING SYSTEMS

CROSS-REFERENCE TO RELATED CASES

This U.S. patent application claims priority from U.S. provisional patent application Ser. No. 60/947,618 to Destain, filed Jul. 2, 2007, the subject matter being incorporated herein by reference in its entirety.

This U.S. patent application is related to U.S. patent application "An Optical Structure and an Imaging System Using the Same," 11/856,010 and "An Optical Architecture", 11/856,004, both to Grasser and filed on the same day as this application; the subject matter of each being incorporated herein by reference in its entirety.

TECHNICAL FIELD OF THE DISCLOSURE

The technical field of this disclosure relates to the art of optical devices and architectures and more particularly to the art of optical devices and optical architectures employing reflective or refractive polygon for use in imaging systems.

BACKGROUND OF THE DISCLOSURE

In recent years, solid-state light illuminators, such as LASERs and light-emitting-diodes (LEDs), and other narrow-banded light illuminators capable of producing phase-coherent light, such as wavelength specific plasma lamps, have drawn significant attention as alternative light sources to traditional light sources, such as arc lamps, for use in imaging systems, especially imaging systems employing light valves each comprising an array of individually addressable pixels, due to many advantages, such as compact size, greater durability, longer operating life, and lower power consumption.

Regardless of the widely embraced superior properties of solid-state illuminators over traditional light sources, it is however difficult to optically couple solid-state illuminators with light valves. For example, it is difficult to generate a far-field illumination area with uniform illumination intensity at the light valve location using solid-state or narrow-banded light illuminators because the illumination light from the solid-state illuminators and most narrow-banded illuminators are highly collimated as compared to the light from traditional illuminators.

Therefore, it is desired to have an optical device and/or an optical architecture, with which light of different colors from the illuminators can be incident to the target (e.g. light valve) simultaneously; and narrow-banded light (e.g. lasers) can be efficiently coupled to the target.

SUMMARY

In view of the foregoing, an optical architecture having a rotating polygon is disclosed herein.

In one example, an optical system for use in illuminating a light valve of a display system is disclosed herein. The optical system comprises: an illumination unit comprising a set of illuminators for providing light; a refractive cylinder having a substantially constant polygonal cross-section perpendicular to a major axis of the refractive cylinder; wherein the refractive cylinder is attached to a moving mechanism such that the cylinder is capable of rotating relative to the light; and a field lens disposed between the illumination unit and the refractive cylinder.

In another example, an optical system for illuminating an array of individually addressable pixels in a light valve of a display system is disclosed herein. The optical system comprises: an illumination unit comprising a set of illuminators for providing light; a refractive cylinder having a substantially constant polygonal cross-section perpendicular to a major axis of the refractive cylinder; wherein the refractive cylinder is attached to a moving mechanism such that the cylinder is capable of rotating relative to the light; and wherein the light from the illuminator unit is optically coupled to the refractive cylinder such that a pupil of the light from the illuminator unit has an image substantially at an exit facet of the refractive cylinder, wherein the exit facet is a facet through which the light exit from the refractive cylinder after passing through the refractive cylinder.

In yet another example, an optical system for use in illuminating a light valve of a display system is disclosed herein. The optical system comprises: an illumination unit comprising a set of illuminators for providing light; a refractive cylinder having a substantially constant polygonal cross-section perpendicular to a major axis of the refractive cylinder; wherein the refractive cylinder is attached to a moving mechanism such that the cylinder is capable of rotating relative to the light; and a collimation lens disposed at an optical axis of the optical system and after the refractive cylinder.

In yet another example, an optical system for use in illuminating a light valve of a display system is disclosed herein. The optical system comprises: an illumination unit comprising a set of illuminators for providing light; a refractive cylinder having a substantially constant polygonal cross-section perpendicular to a major axis of the refractive cylinder; wherein the refractive cylinder is attached to a moving mechanism such that the cylinder is capable of rotating relative to the light; and wherein the refractive cylinder comprises an optical material with a refractive index that is determined by a number of facets of the polygonal cross-section of the refractive cylinder.

BRIEF DESCRIPTION OF DRAWINGS

FIG. 19b schematically illustrates an exemplary illumination unit for use in the optical system of FIG. 19a;

DETAILED DESCRIPTION OF SELECTED EXAMPLES

In the following, the optical system/architecture and imaging systems using the same will be discussed with selected examples wherein the imaging system is a display system that employs a light valve having an array of individually addressable pixels. However, it will be appreciated by those skilled in the art that the following discussion is for demonstration purpose, and should not be interpreted as a limitation. Other variations within the scope of this disclosure are also applicable. For example, other imaging systems, such as systems for storing information of image (e.g. 2D images or holographic images) in image storing mediums are also applicable.

Display Systems with Beam-Scanning Mechanisms

Figure 1:
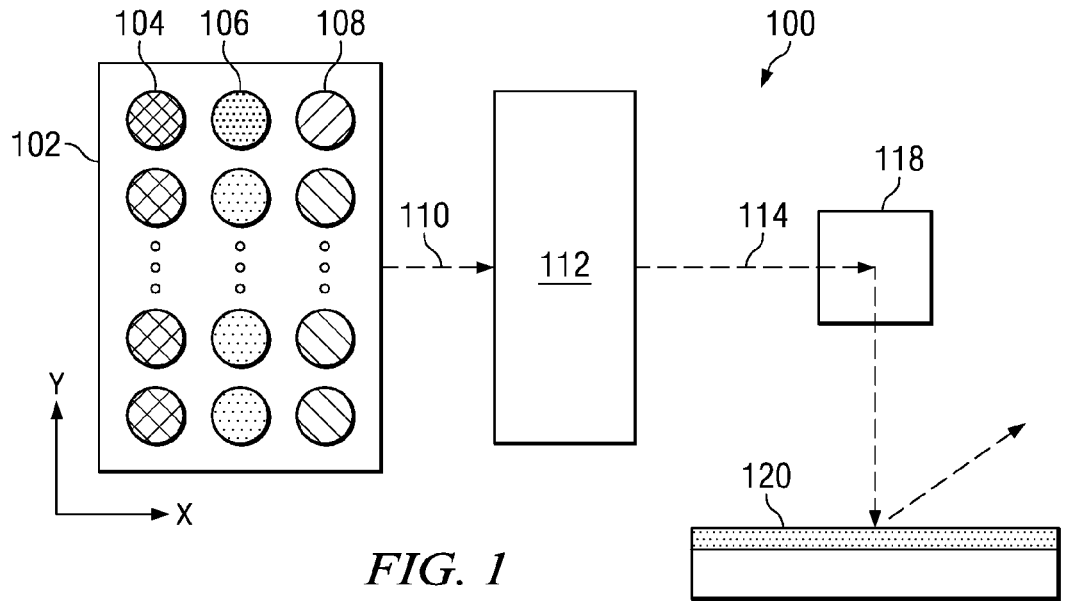
FIG. 1 schematically illustrates an exemplary display system in which an optical architecture having a rotating polygon can be implemented for illuminating the light valve of the display system.

Referring to the drawings, FIG. 1 schematically illustrates an exemplary display system in which examples of this disclosure can be implemented. In this example, display system 100 comprises illuminator unit 102 providing light 110. Light 110 is directed to scanning unit 118. The scanning unit projects the incident light onto light valve 120 for generating an illumination field on the light valve; and moves the generated illumination field across the light valve for sequentially illuminating the individually addressable pixels of the light valve. The light valve pixels illuminated by the light at or during a time period modulate the light based on an image to be produced. The modulated light is then directed toward or away from a display target (e.g. a display screen) so as to form the image on the display target.

As an alternative feature, beam-shaping unit 112 can be provided for modifying the light from the illuminator unit (102) so as to obtain modified light with a desired profile (e.g. shape of the illumination field and intensity distribution across the illumination field). In the example as shown in FIG. 1, light 110 from illuminator unit (102) can be directed to beam-shaping unit 112 that modifies light 110 into modified light 114 that has a desired profile. The modified light (114) is then directed to scanning unit (118) for producing the desired image. Though not required, beam-shaping unit can be of importance when multiple light sources (e.g. lasers) are employed for providing sufficient power.

For providing light beams with sufficient power corresponding to the desired brightness of produced images on the screen (not illustrated for simplicity), illuminator unit 102 may comprise multiple solid-state illuminators, such as lasers and other suitable light emitting devices. In one example, the illuminators can be laser sources, such as those of NEC-SEL™ technologies from Novalux, Inc. and solid-state lasers from Collinear Inc. and Coherent Inc. The lasers, when used in the illuminator unit (102), are preferred to have a light power of from 50 mW or higher per color used in the system for producing the image (e.g. the red, green, or the blue color), such as 1 W or higher per color, and more preferably 3 W or higher per color. When multiple laser sources are used for providing sufficient light intensity, it is preferred, though not required, that 5 or more, 10 or more, 17 or more, 24 or more, laser sources (or independent laser units), are used for each color light.

The illuminators of the illuminator unit (102) can be arranged in many ways, such as arrays based on the color of the light emitted by the illuminators. Specifically, illuminators emitting light of substantially the same color (characteristic wavelength) can be arranged in one straight line; and illuminators emitting different color of light beams can be arranged in separate lines, while the separate lines can be substantially parallel. As illustrated in FIG. 1, illuminator arrays 104, 106, and 108 each comprise illuminators emitting substantially the same color light beam, such as red, green, blue, white, yellow, cyan, magenta, and any desired combinations thereof.

Each illuminator array may comprise any suitable number of illuminators. However, it is preferred that the each array comprises a number of illuminators such that the total output power of the illuminators in the array satisfies the desired brightness of the produced images on the screen.

Illumination unit 102 may comprise any suitable numbers of arrays of illuminators with each array corresponding to a particular color based on the desired illumination scheme for illuminating the light valve and for producing the desired image. For example, the illumination unit (102) may comprise illuminators capable of emitting light of primary colors with a primary color being defined as a color that is not a combination of other colors, such as red, green, and blue colors. Alternatively, the illumination unit may comprise illuminators capable of emitting light of secondary colors with a secondary color being defined as a color that is a combination of primary colors, such as while, yellow, cyan, magenta, and other colors. In examples wherein secondary colors are used by imaging systems for producing images, illuminators capable of emitting primary colors can still be used by operating the illuminators in a way such that illuminators emitting different primary colors are turned on and off based on a specific duty cycle. Primary colors can then be added to obtain desired secondary colors.

Figure 2A:
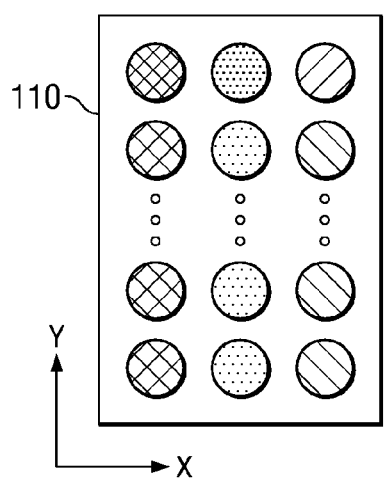
FIG. 2a schematically illustrates an illumination field of the light emitting from the illuminators and before the beam-shaping device of the display system in FIG. 1.

When the illuminators are laser sources or the like that emit collimated light, light 110 from the illuminator unit (102) that comprises illuminators arranged in arrays for certain patterns may exhibit a non-uniform intensity distribution, as schematically illustrated in FIG. 2a.

Referring to FIG. 2a, the near-field of light 110 from the illuminator unit is schematically illustrated therein. The illumination pattern in the near-field corresponds to the arrangement of the illuminators in the illuminator unit (102 in FIG. 1). Light beams of the same color in the near-field is not uniform along the illuminator array (e.g. along the Y direction).

The intensity non-uniformity can be corrected in many ways. In one example, the intensity non-uniformity can be corrected by beam-shaping unit 112 in FIG. 1. Alternatively, the intensity non-uniformity can be corrected by a proper optical architecture of the system. Regardless of different correction methods, it is preferred that the illumination field on the light valve has a substantially uniform intensity distribution along the direction perpendicular to the scanning (moving) direction of the illumination field. As a way of example, an illumination field with an exemplary preferred (though not required) intensity distribution is schematically illustrated in FIG. 2b through FIG. 2d.

Figure 2B:
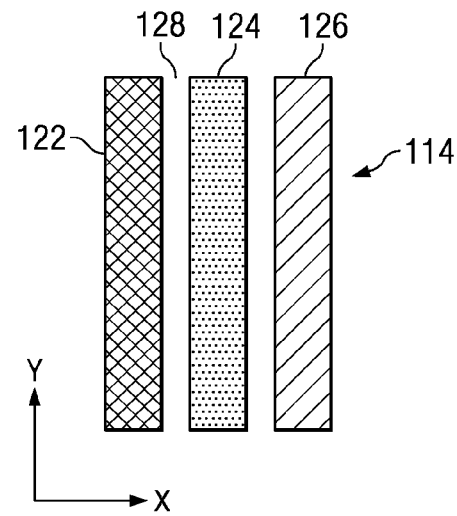
FIG. 2b schematically illustrates an illumination field of the illumination light after the beam-shaping device of the display system in FIG. 1.

FIG. 2b schematically illustrates the near-field of the light beams after the beam-shaping unit (112 in FIG. 1). Correspondingly to the arrangement of the illuminators, color light beams from the illuminators in the same array are modified into a substantially illumination stripe. Specifically, color illumination field 114 comprises color stripes 122, 124, 126, and blank sub-fields between color stripes (e.g. blank sub-field 128 between color stripes 122 and 124). A blank sub-field is an area that is substantially not illuminated by the light from the illuminator unit (102 in FIG. 1). Color stripes 122, 124, and 126 each extend along the direction of the illuminator array (e.g. the Y direction). Each color stripe has a desired intensity distribution as schematically illustrated in FIG. 2c and FIG. 2d.

Figure 2C:
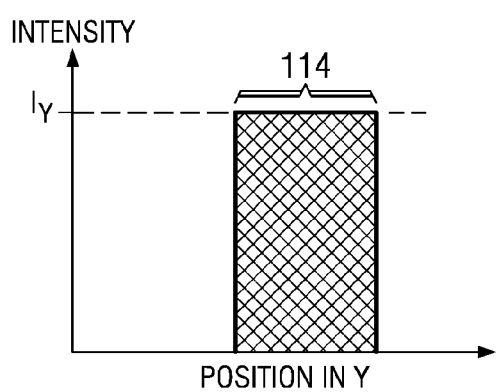
FIG. 2c schematically illustrates an exemplary intensity distribution of the illumination field on FIG. 2b along one direction.
Figure 2D:
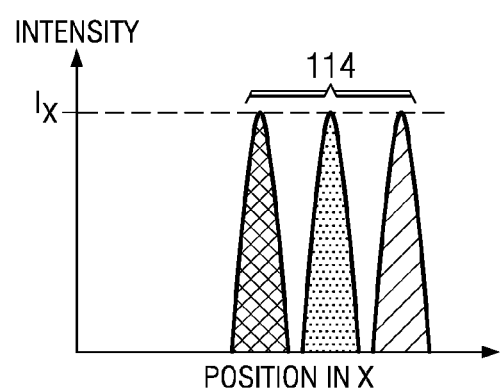
FIG. 2d schematically illustrates an exemplary intensity distribution of the illumination field on FIG. 2b along another direction.

FIG. 2c schematically illustrates an intensity distribution of the color stripes along the Y direction (the length of the color stripes) as defined in FIG. 2a. In this example, each color stripe has a uniform intensity distribution along the length of the color stripe. Even shown in FIG. 2c that all color stripes have substantially the same maximum intensity $I_y$, this is one of many possible examples. In other examples, different color stripes may have different maximum intensity along the length (Y direction) depending upon the specific illuminators used.

Each color stripe may have any desired intensity distributions along the width (X direction) of the color stripe, such as uniform, Gaussian, top-hat, triangle, and random distributions. FIG. 2d schematically illustrates an exemplary Gaussian intensity distribution of the color stripes along the width of the color stripes. In this example, all color stripes have substantially the same maximum intensity $I_x$, this is one of many possible examples. In other examples, different color stripes may have different maximum intensity along the width (X direction) depending upon the specific illuminators used. In some examples, different color stripes may have different of intensity-distribution forms along the width of the color stripes. For example, one or more color stripes may have a random intensity distribution; while another one or more color stripes may have a uniform or a Gaussian intensity distribution along the width of the color stripes; and different color stripes may or many not have the same maximum intensity along the width.

Figure 3:
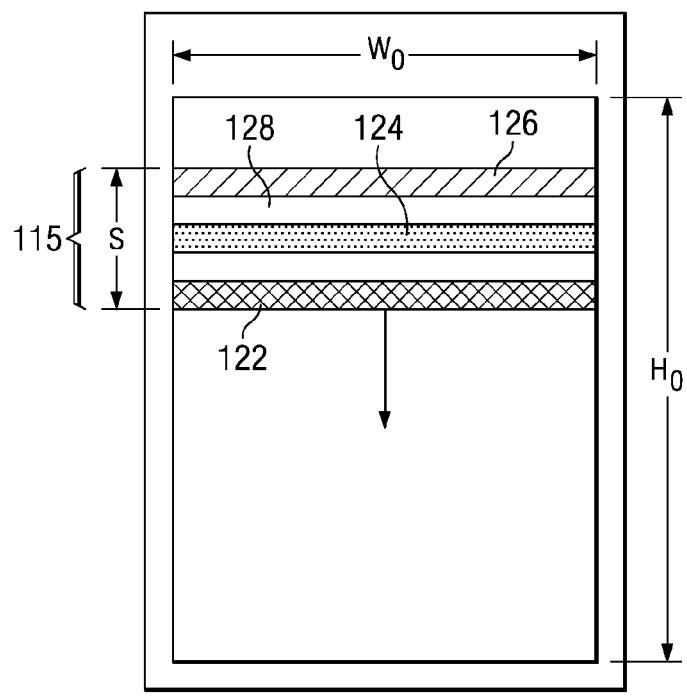
FIG. 3 schematically demonstrates an illumination field that is generated on the light valve of the display system in FIG. 1; and swept across the light valve for illuminating the light valve.

The illumination field generated on the light valve is moved across the light valve so as to sequentially illuminate the light valve pixels. As a way of example, FIG. 3 schematically demonstrates the movement of the illumination field (115) on the pixel array of light valve. The illumination field (115) is generated by the light beams from the illuminator unit (and the beam-shaping unit if provided) and the canning unit (118) in FIG. 1; and therefore, has a corresponding profile to that shown in FIG. 2b.

The dimension of the pixel array can be characterized by width $W_0$ and height $H_0$. In one example, $W_0$ can be 480 pixels or more, 600 pixels or more, 720 pixels or more, 768 pixels or more, 1024 pixels or more, 1050 pixels or more, 1200 pixels or more, with each pixel having a characteristic length of 200 microns or less, 150 microns or less, 100 microns or less, 50 microns or less, 20 microns or less, 14 microns or less, 8 microns or less. $H_0$ can be 640 pixels or more, 800 pixels or more, 1024 pixels or more, 1280 pixels or more, 1400 pixels or more, 1600 pixels or more, and 1920 pixels or more, with each pixel having a characteristic width of 200 microns or less, 150 microns or less, 100 microns or less, 50 microns or less, 20 microns or less, 14 microns or less, 8 microns or less. In another example, H can be from 5 mm to 30 mm, such as from 10 mm to 20 mm. The total width of the color stripes including the blank subfields (if provided) is s. s can be a value such that the ratio of s to $H_0$ is 1/500 or higher, such as 1/200 or higher, 1/100 or higher, 1/50 or higher, 1/20 or higher, or 1/10 or higher, and preferably less than 1/2.

Corresponding to the exemplary light stripes as illustrated in FIG. 2b, the illumination field (115) comprises color stripes 122, 124, and 126 with blank fields (e.g. blank field 128) between adjacent color stripes. In one example, the color stripes can be equally spaced. The total width s can be substantially equal to the height $H_0$ of the pixel array. For N color stripes that are equally spaced with blank sub-fields, the total width s of the N sub-fields and the blank sub-fields is preferably $H_0 \times (1-(\frac{1}{2} \times N))$ with $H_0$. A blank sub-field between two consecutive color stripes may be designed to provide a time period during which light valve pixels of a display system can be updated. In particular, the size (width) of a blank sub-field can be determined based on the minimum update (state-switching) time period of light valve pixels.

It is noted that FIG. 2a through FIG. 3 illustrate only one of many possible configurations. Other configurations are also applicable. For example, the illumination field (115) may comprise any suitable numbers of color stripes and/or blank fields; and the illumination field may also comprise multiple color stripes of the same color. In one example, the illumination field may comprise color stripes of R-G-B, R-G-B-W, R-R-G-G-B-B, R-R-G-G-B-B-W, R-G-B-Y-C-M, R-G-B-Y-C-M-W, with R, G, B, W, Y, C, and M respectively representing red, green, blue, white, yellow, cyan, and magenta colors. Blank sub-fields can be distributed between colored sub-fields in any desired ways if provided.

Referring again to FIG. 1, the beam-scanning unit (118) can be reflective or refractive. Examples of refractive beam-scanning unit (118) are set forth in U.S. patent application "An Optical Architecture" to Grasser, 11/856,004, filed on the same day as this application, the subject matter of which is incorporated herein by reference in its entirety. Alternatively, beam-scanning units can be transmissive beam-scanning units (also referred to as refractive beam-scanning unit), as will be discussed in the following. A transmissive beam-scanning unit comprises a material that is transmissive to the light from the illuminator unit; and exhibits a specific refractive index to the light.

Figure 4:
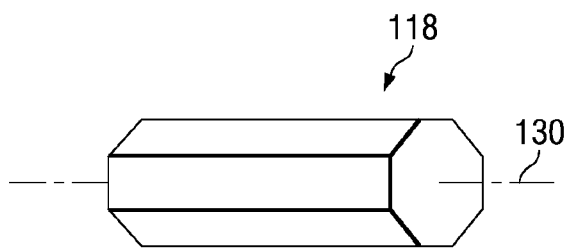
FIG. 4 schematically illustrates an exemplary refractive polygon for use in the display system in FIG. 1.
Figure 5:
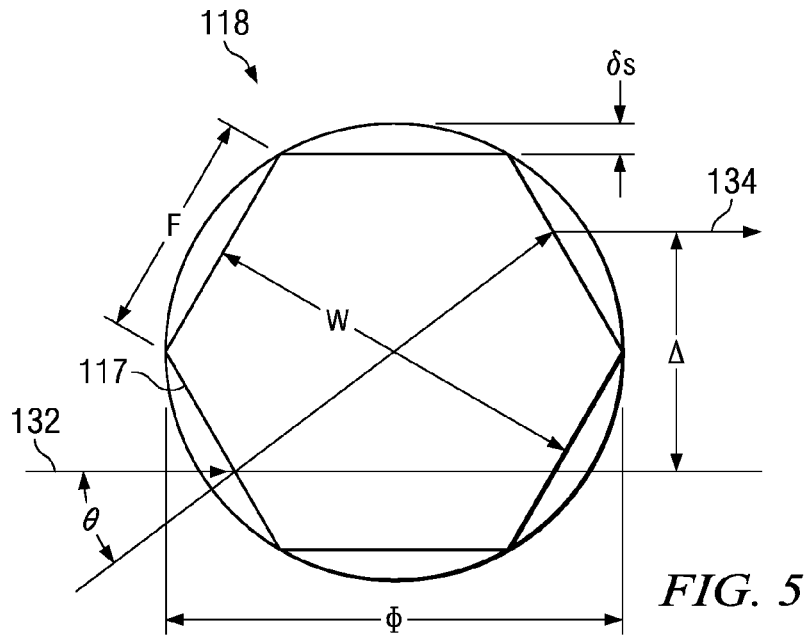
FIG. 5 schematically illustrates a cross-sectional view taken along the plane perpendicular to the major axis of the polygon.

As a way of example, FIG. 4 schematically illustrates a perspective view of a refractive beam-scanning unit, which in this example, is a transmissive cylinder. Referring to FIG. 4, transmissive cylinder 118 comprises a number of facets. The facets are substantially parallel to major axis 130. The major axis can also be the rotation symmetric axis of the cylinder. The cross-section of the cylinder taken along a plane perpendicular to the major axis of the cylinder can be a regular polygon, as illustrated in FIG. 5. The refractive cylinder may comprise a wide range of materials that are transmissive to the incident light used in imaging systems. For example, the refractive cylinder may comprise glass, quartz, sapphire, transmissive polymers, transmissive plastics, and many other materials, such as gradient index materials. Exemplary refractive cylinder can comprise as SF56 and SF66 or SF57 and SF6 glass materials.

Basics of Refractive Polygon

Referring to FIG. 5, the refractive cylinder (118) has a thickness, which can be characterized by the width W of the cross-section, which is measured by the length of a line passing through the origin of the circumcircle of the polygon and between the opposite facets of the polygon. The circumcircle has a diameter $\Phi$. Each facet of the refractive cylinder has a width (the dimension perpendicular to the major axis of the cylinder) F, which corresponds to the length of the polygon in the cross-section. The maximum distance between the circumcircle and each facet of the polygon is characterized by $\delta s$. It is noted that even though the refractive cylinder as illustrated and discussed above is a cylinder with a regular polygon cross-section, this is only one of many possible examples. Other refractive cylinders are also applicable, such as refractive cylinders with irregular polygon cross-sections.

Due to optical refraction, light passing through the refractive cylinder is refracted-resulting in a displacement between the output light (refracted light) and the incident light. As an example, light beam 132 is incident to the cylinder through entrance facet 117 with an incident angle $\Theta$ that is defined as the angle between the chief-ray of the incident light and the normal direction of the entrance facet. An entrance facet is referred to as a facet of the cylinder through which the incident light enters into the refractive cylinder. It is noted that an entrance facet can be any one of the facets because the cylinder is movable (rotatable around the major axis). The light passes through the body of the refractive cylinder and exit from an exit facet of the refractive cylinder. An exit facet is referred to as a facet from which the light exits from the cylinder. It is noted that an exit facet can be any one of the facets because the cylinder is movable (rotatable around the major axis). The chief ray of exit light 134 (refracted light) can be parallel to the chief-ray of incident light 132, but has a displacement $\Delta$ as shown in the figure. It is noted that the chief-rays of the light 132 and 134, as well as the light traveling inside the body of the cylinder, can be on the same plane that is perpendicular to the major axis of the cylinder. In other words, when the incident light is incident to the refractive cylinder perpendicularly to the major axis of the cylinder, such light can be substantially perpendicular to the major axis when traveling inside the cylinder body and exiting from a facet of the cylinder. In other examples, the plane on which the light entering into, passing through, and exiting from the refractive cylinder may not be perpendicular to the major axis of the cylinder. The relationships of the above basic geometric parameters for a refractive cylinder can be expressed as follows:

$$W = \Phi \times \cos(\pi/n) \quad \text{(eq. 1a)};$$

$$\delta s = \Phi \times (1 - \cos(\pi/n))/2 \quad \text{(eq. 1b)};$$

$$F = W \times \tan(\pi/n) \quad \text{(eq. 1c)};$$

$$\Phi = F/\sin(\pi/n) \quad \text{(eq. 1d)};$$

wherein n is the number of facets of the polygon (refractive cylinder).

Displacement and Linearity

The displacement $\Delta$ as discussed above with reference to FIG. 5 can be expressed as:

$$\Delta(mm) = W \times \sin(\Theta) \times \left(1 - \sqrt{\frac{1 - \sin^2\Theta}{N_r^2 - \sin^2\Theta}}\right) \quad \text{(eq. 2)}$$

Wherein $\Theta$ is the incident angle; and $N_r$ is the refractive index of the transmissive cylinder. With the small angle approximation of $\sin(\Theta) \approx \Theta$, equation 2 can be reduced to equation 3:

$$\Delta(mm) = W \times \Theta \times \frac{N_r - 1}{N_r} \quad \text{(eq. 3)}$$

As can be seen in equation 2, the displacement $\Delta$ varies with the incident angle. In the small angle approximation as expressed in equation 3, the displacement $\Delta$ is proportional to the incident angle. By moving (e.g. rotating around the major axis of the cylinder) the refractive cylinder properly, the incident angle can be changed. As a consequence, the displacement $\Delta$ can be varied relative to the propagation path of the incident light. Such phenomenon can then be used to generate an illumination field on the pixel array of the light valve; and moving the generated illumination field across the light valve so as to sequentially illuminate the pixel array of the light valve.

It is often desired (though not required) that the generated illumination field moves uniformly as the refractive cylinder moves (e.g. rotating around the major axis of the cylinder). Uniform movement can be of great importance for the modulation operations of the light valve pixels, as well as control and synchronization of other functional member of the display system. The translational movement of the generated illumination field across the pixel array of the light valve can be characterized by scanning linearity $L_{inearity}$. Linearity is defined as the linear dependence of the chief-ray displacement $\Delta$ to the rotation angle of the refractive cylinder. As an example, FIG. 6a and FIG. 6b schematically demonstrate an exemplary rotation angle dependence of the chief-ray displacement; and the relationship between the maximum non-linearity and the refractive index.

Figure 6A:
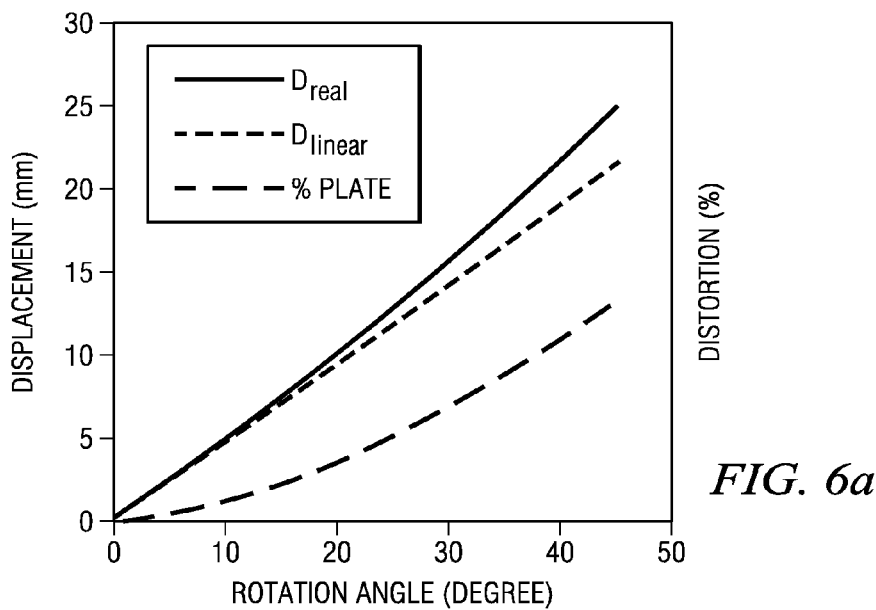
FIG. 6a is a diagram illustrating the relationship between the rotation angle of a polygon and the displacement of the light after the polygon.
Figure 6B:
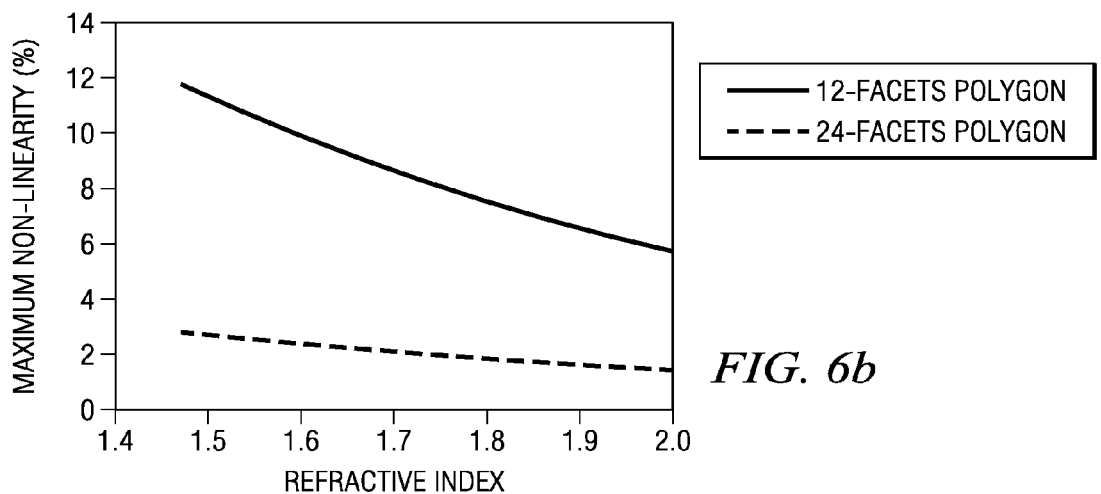
FIG. 6b is a diagram demonstrating a relationship between the maximum non-linearity and the refractive index of an exemplary transmissive polygon.

Referring to FIG. 6a, the left vertical axis plots the displacement of the chief-ray in millimeter; and the horizontal axis plots the rotation angle of the exemplary refractive polygon. In the small rotation angle region (e.g. from 0 to around 20° degrees), the displacement (represented by the solid-line) is substantially linear—coincident with the ideal linear line (represented by the dash-line). This is compliance with the equation 3 as discussed above. When the rotation angle is larger than 20° degrees, the displacement deviates from the ideal linear line; and increases monotonically above the ideal linear line—exhibiting non-linearity. Because the displacement curve is above the idea linear line, the chief-ray exiting from the refractive cylinder accelerates with a positive acceleration rate when the refractive cylinder is rotated more than 20° degrees in this example. The non-linearity is better characterized by distortion that is defined as equation 4.

$$\text{Distortion } (\%) = \frac{\Delta_{real} - \Delta_{linear}}{\Delta_{linear}} \times 100 \qquad \text{(eq. 4)}$$

The distortion variation with the rotation angle of the refractive cylinder is plotted as dotted line in the right vertical axis of FIG. 6a.

FIG. 6b is a diagram showing the maximum non-linearity versus the refractive index of refractive polygons with 12 facets (solid-line) and 24 facets (dotted-line). It can be seen from FIG. 6b, the maximum non-linearity decreases as the refractive index increases. For the same refractive index, polygons with more numbers of facets have lower maximum non-linearity.

Figure 7A:
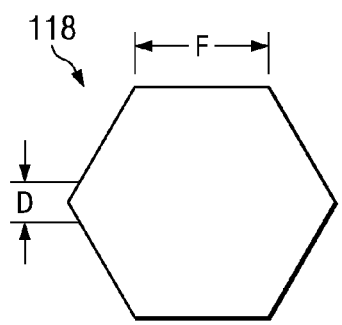
FIG. 7a illustrates a duty cycle of the polygon vs. stripe width and a facet width of an exemplary polygon.
Figure 7B:
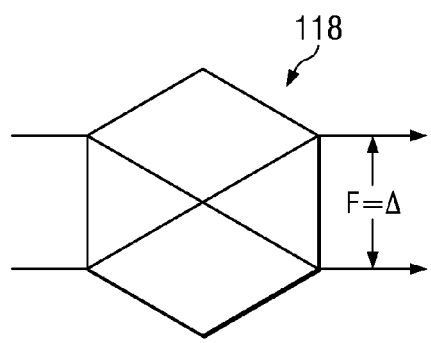
FIG. 7b illustrates an optimum duty cycle of a polygon.

Another factor related to the optical performance of refractive cylinders is duty cycle, which is defined as 1−D/F, wherein D is the characteristic dimension (e.g. the width or the diameter) of the illumination area of the incident light on the refractive polygon; and F is the width of the facet (the length of an edge of the polygon), as schematically illustrated in FIG. 7a. As the refractive rotates, corners of each facet sweep through the illumination area from one side to the other. During this sweeping time period, the light bundle of the illumination area can be refracted along different directions within the refractive cylinder—resulting in separate light exiting from the refractive cylinder. The separate light then illuminate separate and discontinuous portions, such as the top and bottom portions, of the pixel array of the light valve. This time period may not be usable for image processing or image displaying; and may be discarded. When the illumination area D on the facet is large, a corner of the facet intercepts the illumination area for a longer time period, which degrades the efficiency and performance of the system. Therefore, it is preferred (though not required) to have a larger duty cycle with reduced illumination area D. In an ideal situation, the illuminated area on the light valve can be substantially equal to the width F of the facet. As a consequence, the displacement Δ is substantially equal to F, as schematically illustrated in FIG. 7b. The illumination field caused by the refracted light (exiting from the refractive cylinder) on the pixel array of the light valve preferably illuminates the entire pixel array as discussed above. By combining equations 1c and 3, along with F=Δ, equation 5 for the refractive index $N_r$ can be obtained.

$$N_r \cong \frac{2 \ast \pi}{n \times \tan\left(\frac{\pi}{n}\right)} \qquad \text{(eq. 5)}$$

Figure 8:
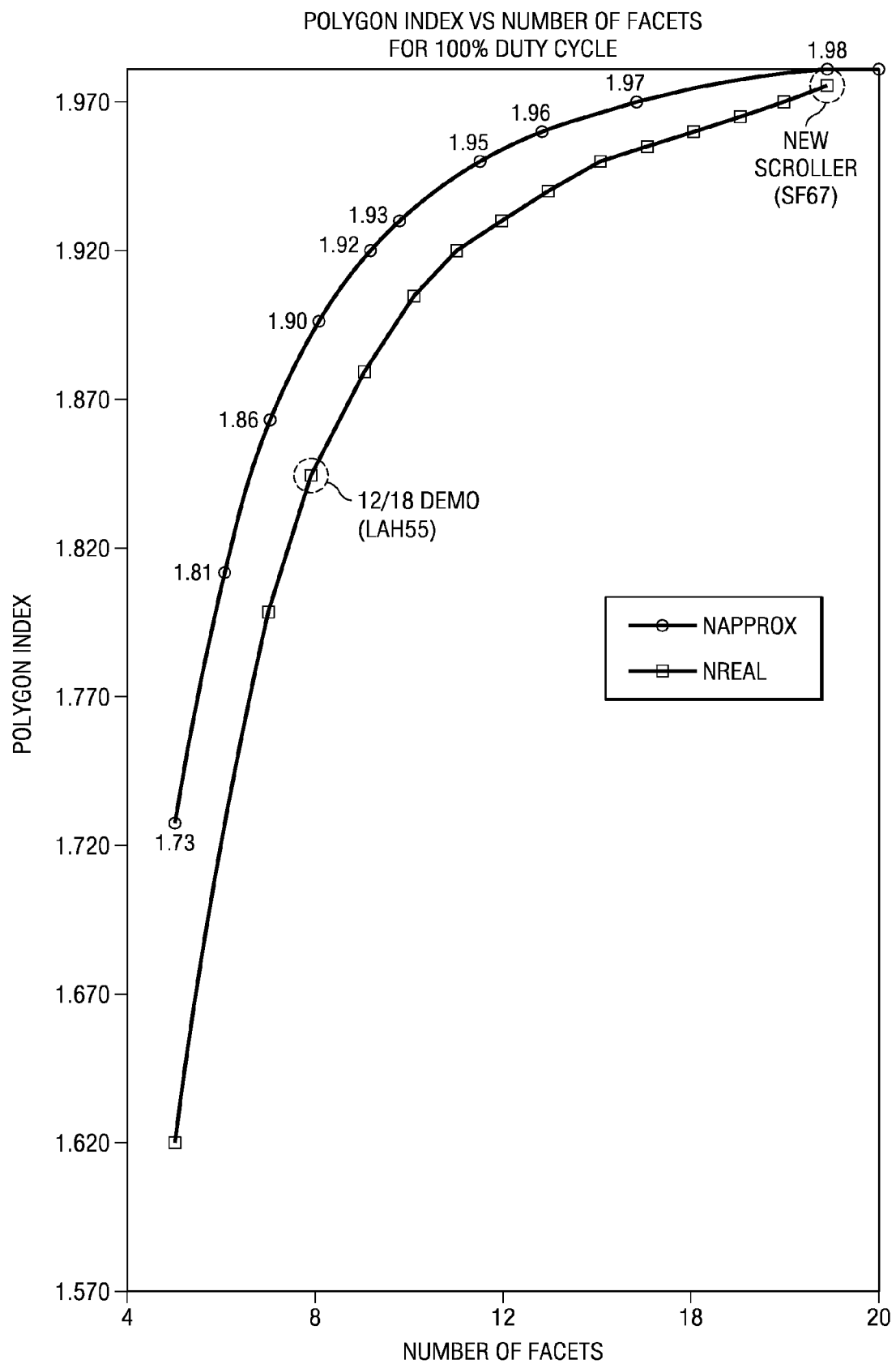
FIG. 8 is a diagram demonstrating a relationship between a polygon refractive index and the number of facets with a substantially 100% duty cycle and a minimum polygon dimension.

The above equation 5 is plotted in the diagram of FIG. 8 with the refractive index $N_r$ being plotted on the vertical axis; and the number of facets n being plotted on the bottom horizontal axis.

As can be seen in FIG. 8, for maintaining 100% duty cycle (D=F), the refractive index monotonically increases with the increase of the number of facets. For example, to maintain substantially 100% duty cycle, lower number of facets (e.g. around 5 to 6 facets) is desired when the refractive cylinder composes a material with a lower refractive index (e.g. n is around 1.6). For the same reason, a refractive cylinder with a higher refractive index (e.g. around 1.9 or more) is desired when the cylinder has a larger number of facets (e.g. around 12 or more). In other examples, refractive polygons with other refractive indices are also applicable, especially when to satisfy other expectations. For example, a refractive polygon with a high refractive index (e.g. 1.6 or higher) and a lower number of facets (e.g. 5 or lower facets) can be used for optimizing transmission (or minimizing transmission loss) of particular light, such as light with a wavelength equal to or shorter than that of the blue light (465 nm wavelength).

Figure 9:
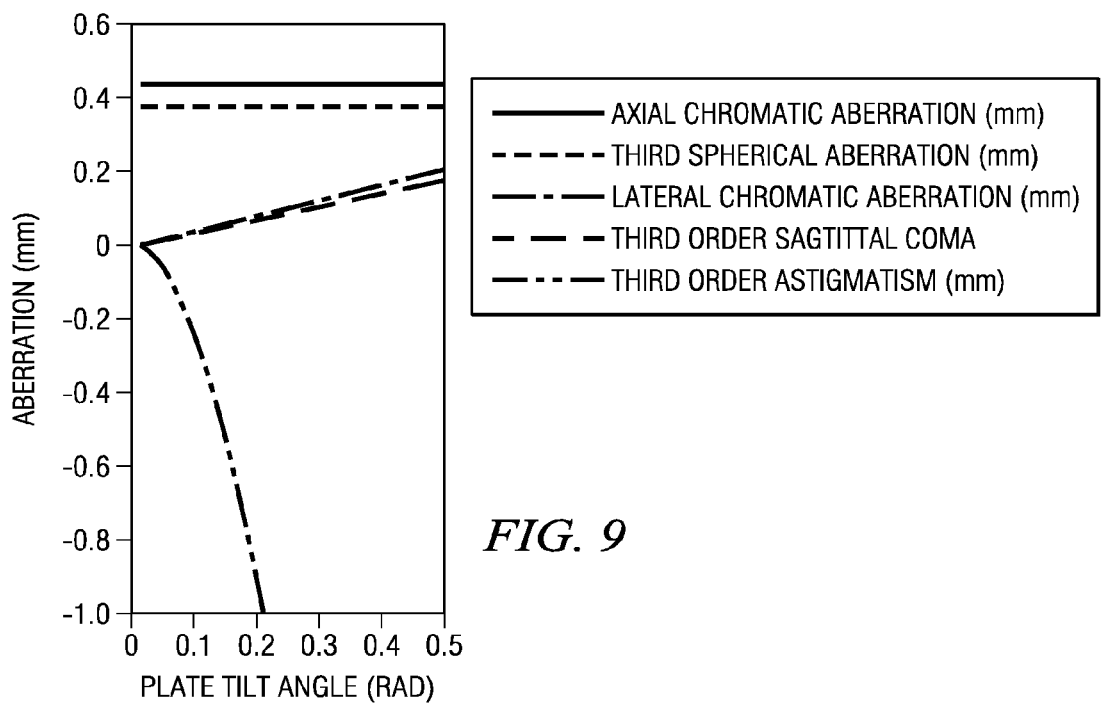
FIG. 9 is a diagram demonstrating third order relationship between aberration and the tilt angle of an exemplary tilted transmissive plate.

Another optical property of a refractive cylinder is aberration, as illustrated in the diagram of FIG. 9. Referring to FIG. 9, the axial chromatic aberration ($AC_{aber}$), spherical aberration (SA3), astigmastic aberration (AST3), sagittal coma aberration (COM3), and the lateral color aberration (LC) can be expressed as equations 6 through 10 in the following:

$$AC_{aber} = t \frac{N_r - 1}{N_r^2 \times V} \qquad \text{(eq. 6)}$$

$$SAT3 = t \times u^2 \times \frac{N_r^2 - 1}{2N_r^3} \qquad \text{(eq. 7)}$$

$$AST3 = -t \times \Theta^2 \frac{N_r^2 - 1}{N_r^3} \qquad \text{(eq. 8)}$$

$$COM3 = t \times u^2 \times \Theta \times \frac{N_r^2 - 1}{2N_r^3} \qquad \text{(eq. 9)}$$

$$LC = t \times \Theta \times \frac{N_r - 1}{N_r^2 \times V} \qquad \text{(eq. 10)}$$

In the above equations, t is the physical length of the light path of the light traveling within the refractive cylinder. In one example, t is equal to the thickness W of the refractive cylinder. u is the f-number half angle; Θ is the incident angle; $N_r$ is the refractive index of the refractive cylinder; and V is the Abbe number of the refractive cylinder. All of the above aberrations are expressed in millimeters; and the angles are expressed in radians. The aberrations plotted in the diagram in FIG. 9 are obtained from glass BK7 with 45 mm thickness as an example.

It can be obtained from equations 6 through 10 that the higher the refractive index, the lower SAC3 and AST3 are. The AST3 parabolic aberration effect reduces as the incident angle decreases. The axial chromatic aberration is substantially independent from the tilt angle, and so is the spherical aberration SA3. In general, smaller incident angle and/or larger number of facets benefit the reduction of aberration. However, larger number of facets often increases the physical size of the refractive cylinder, which in turn, increases the cost and causes other difficulties, such as mechanical design and installation of large-sized refractive cylinder to a moving mechanism. Therefore, design of the polygon, including the material and the geometric configuration (e.g. number of facets) is expected to be balanced between the optical performance, cost-efficiency, reduction of aberration, and other factors to best satisfy expectations of specific display systems.

Depending upon different configurations of refractive cylinders, light incident to a refractive cylinder can be directed in a wide range of different ways. For demonstration purpose, FIG. 10 schematically illustrates light from a point light source passing through an exemplary refractive cylinder.

Figure 10:
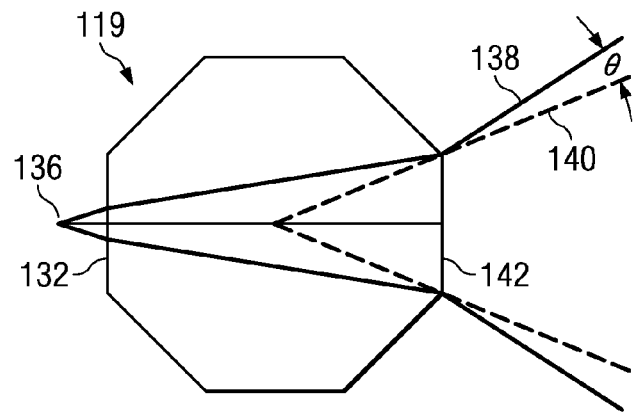
FIG. 10 schematically demonstrates the maximum f-number of a single color on axis light emitted from a light point source that can be subtended by a transmissive polygonal facet without overlap on adjacent facets.

Referring to FIG. 10, a refractive polygon (119) is illustrated in a cross-section that is a regular 8-facets polygon. It is appreciated by those skilled in the art that FIG. 10 is illustrated for demonstration purpose, and should not be interpreted as a limitation. The cross-section can be any suitable polygonal shapes, such as a regular polygon with any desired facets and irregular polygons. In this example, point source 136 is positioned at a finite distance from the refractive polygon such that the light from the point source and incident to the facets of refractive polygon is substantially not collimated.

At a specific time, the light from point source 136 is incident to entrance facet 132, and experiences refraction at the entrance facet. The refracted light after the entrance facet travels within the body of the cylinder, and exits from exit facet 142 of the refractive cylinder. At the exiting facet, the light experiences another refraction; and the refracted light exiting from the refractive cylinder is refracted light 138 as illustrated in FIG. 10. In this example, the angle θ between ray 138 (passing through a corner of exit facet 142) and the extension line (dotted line 140) of the polygon radius describes the angular diverging of the light passing through the refractive cylinder; and is thus referred to as diverging angle.

The maximum f-number of the optical architecture as illustrated in FIG. 10 can be expressed in equation 11.

$$f-\text{number} = \frac{1}{2\sin(\Theta_{air})} \approx \frac{1}{2N_r \times \sin(\pi/n)} \qquad (\text{eq. 11})$$

wherein $N_r$ is the refractive index of the refractive cylinder; and $\Theta_{air}$ is the incident angle of the edge ray from the point source to the entrance facet (118), n is the number of facets of the refractive cylinder (polygon).

Figure 11:
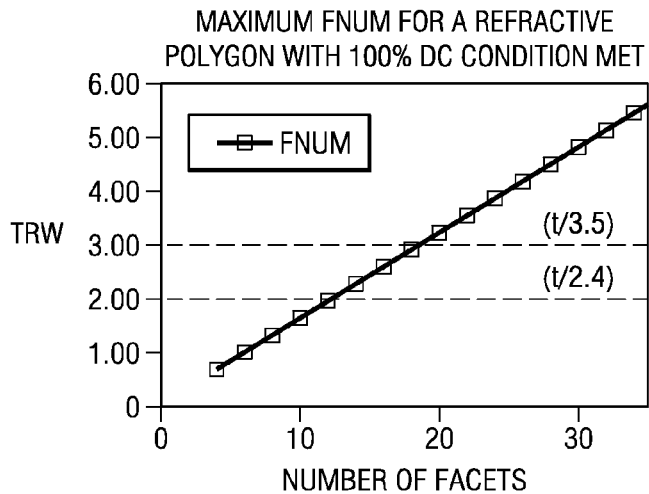
FIG. 11 is a diagram showing a relationship between the f-number and the number of facets of polygons.

It can be seen from FIG. 10 and equation 11 that the f-number is faster for larger refractive indices. The "maximum" angular diverging beam subtended by one facet increases as the refractive index increases. From the above discussion with reference to FIG. 8, it can be seen that as the refractive index increases, the number of facets of the refractive cylinder increases to maintain a high (e.g. 100%) duty cycle. In some exemplary optical designs in display systems, there may be constraints on f-number of the optical components/architectures. For example, projection lenses based on DMD micromirrors devices, f-numbers are expected to be within the range of f/2.4 to f/3.5. Accordingly, the optimum number of facets in a refractive polygon can be from 12 to 20, as schematically illustrated in FIG. 11. It is noted that the f-number range given above is for demonstration purposes. Other ranges or values off-number can also be used.

When using a refractive cylinder as discussed above for projecting light onto a light valve and moving the projected light across the light valve, unwanted optical artifacts may occur. For example, color variation across the pixel array may occur when the size of the refractive polygon is too small such that vignetted rays appear, as schematically illustrated in FIG. 12.

Figure 12:
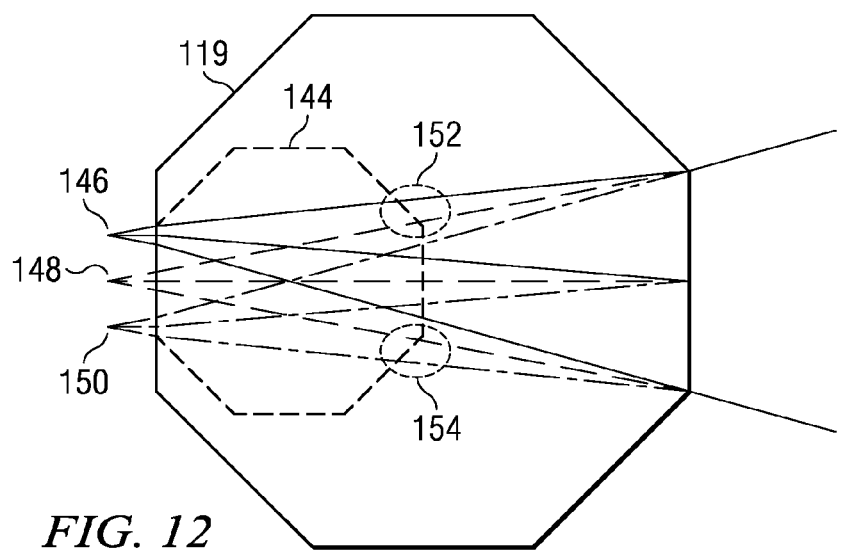
FIG. 12 schematically illustrates the effect of vignetted light after transmissive polygons with different diameters.

Referring to FIG. 12, refractive cylinders 119 and 144 are illustrated in their cross-sectional views; and refractive cylinder 119 has a larger diameter than refractive cylinder 144. In color image display applications, light of different colors are provided and used for sequentially illuminating the light valve pixels. Accordingly, illuminators capable of providing light of the desired colors, such as red, green, blue, cyan, magenta, white, or any combinations thereof, are included in the display system. For demonstration and simplicity purposes; while without sacrificing generality, it is assumed that red, green, and blue color light beams, are used in the optical system in FIG. 12.

For enabling the sequential illumination of the light valve pixels and the accomplishment of the maximized brightness by illuminating the light valve pixels with substantially all light simultaneously, the light of different colors are expected to be telecentric, as illustrated in FIG. 12, or at least with a pupil position compatible with the projection entrance pupil. As an example, a projection lens design may not require telecentric condition but rather expect the entrance pupil to be located inside the optical layout. Such configurations are advantageous to avoid the use of TIR prism to separate off-state and on-state beams. As shown in FIG. 12, illuminators 146, 148, and 150 for the light of different colors are spaced away from each other—such as equally spaced along a straight line parallel to the entrance facet of the refractive cylinder. In one example, one of the three illuminators can be aligned to the entrance facet at a time; while the other two illuminators for different colors can be disposed on the opposite sides of the first illuminator with substantially equal distance. When a group of illuminators for generating each color light is employed so as to improve the brightness, the illuminators of the same group can be deployed along a straight line parallel to the major axis of the refractive cylinder. In the cross-sectional view of FIG. 12, each illuminator 146, 148, and 150 represents a group of illuminators capable of emitting substantially the same color light.

When the refractive cylinder has a small diameter, such as refractive cylinder 144 drawn in the dotted-line, portions (e.g. 152 and 154) of the upper- and lower-beams (e.g. the upper- and lower portions of the beam from illuminator 146) pass through different facets simultaneously. As a consequence, the corresponding illumination fields to the upper- and lower-portions of light can be severely vignetted. The vignetted illumination fields will be perceived by viewers as a color/intensity variation/gradient from the top to the bottom portions of the light valve pixel array.

Figure 13:
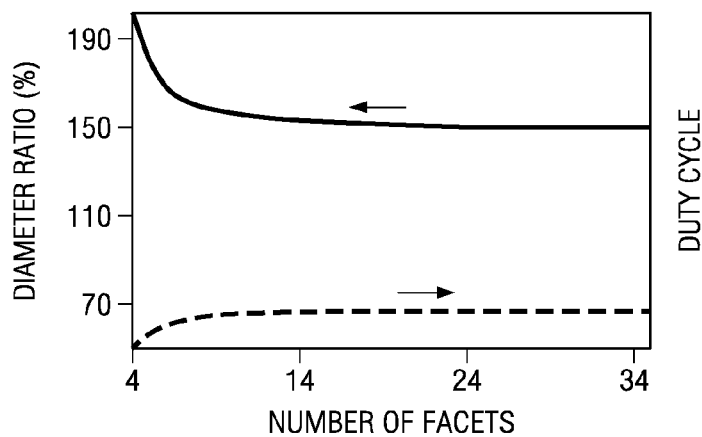
FIG. 13 is a diagram showing a relationship between diameter ratio for an exemplary refractive cylinder and duty cycle in variation with the number of facets.

An approach to eliminate the vignetted rays is to use a refractive cylinder with a larger diameter, such as refractive cylinder 119. Refractive cylinder 119 has a diameter such that the pupil of the exiting rays has substantially the same diameter as the exiting facet. In other words, rays exiting from the refractive cylinder (e.g. 119) are limited within the exit facet. In this way, the vignetted rays can be eliminated. FIG. 13 shows diameter ratio of an exemplary refractive cylinders and duty cycles in variation with the number of facets to avoid vignetted rays. However, the above approach may reduce the duty cycle.

Referring to FIG. 13, the slid-curve plots the diameter ratio in variation with the number of facets. The diameter ratio is defined as the minimum increase of diameter in order to avoid vignetting of the upper and lower stripe during the scrolling through one facet. In this example, for refractive cylinders with 12 or more facets, the diameter ratio is around 150%—meaning the refractive cylinder is oversized 50% or more to avoid vignetted rays. Oversized refractive cylinder, however, may cause other difficulties. For example, oversized refractive cylinders often times are incompatible with driving mechanisms (e.g. motors) for rotating the refractive cylinders. Moreover, larger size may reduce the duty cycle, which in turn, degrades the performance of the display system.

Figure 14:
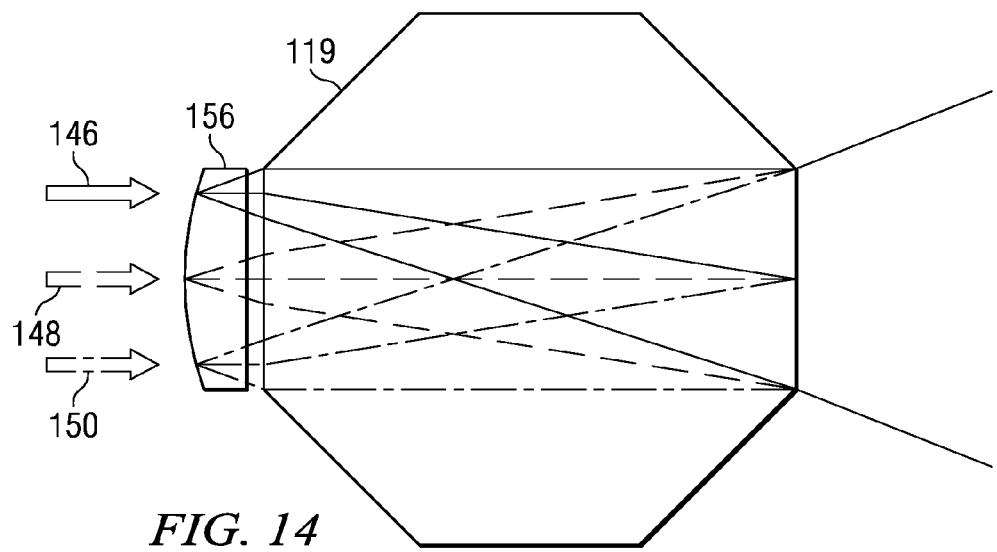
FIG. 14 schematically illustrates a combination of a refractive polygon and a field lens disposed at the entrance facet of the polygon.

Another approach to avoid vignetted rays, while does not oversize the refractive cylinder, is to use a field lens at the entrance facet of the refractive cylinder, as schematically illustrated in FIG. 14.

Referring to FIG. 14, field lens 156 is placed at a position proximate to the entrance facet of cylinder 119. Light from illuminators 146, 148, and 150 are incident to the entrance facet through field lens 156. As a consequence, substantially all light exiting from the illuminators and passing through the field lens and the refractive cylinder is limited within a region corresponding to size of the exit facet. The pupil of the incident light to the refractive cylinder can be substantially coincident to the plane of the exit facet.

Because the pupil of the incident light is substantially coincident to the exit facet of the refractive cylinder, the light of different colors exiting from the exit facet may not be telecentric. As a consequence, the illumination fields on the light valve caused by the light of different colors after the refractive cylinder comprises may be overlapped, resulting in non-pure color fields at the pixel array of the light valve. This problem can be solved by using a collimation lens and dichroic filters, as schematically illustrated in FIG. 15.

Figure 15:
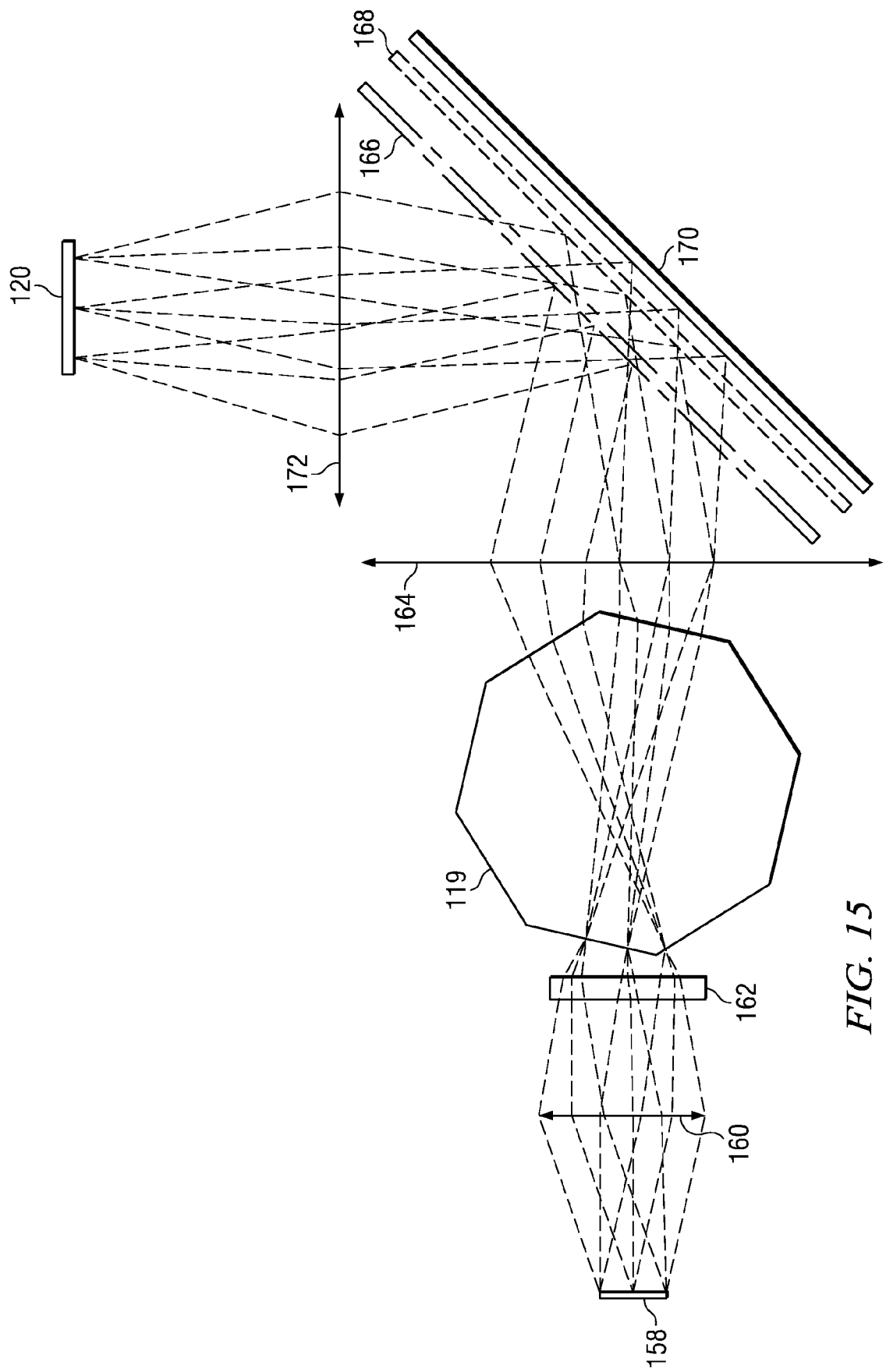
FIG. 15 schematically illustrates an exemplary optical architecture having a refractive polygon for illuminating a light valve.

Referring to FIG. 15, collimation lens 164 is disposed on the optical axis of the optical system and after the refractive cylinder. A stack of dichroic filters (166, 168, and 170) are disposed on the optical axis after the collimation lens (164).

In the example shown in FIG. 15, light of different colors (e.g. red, green, and blue laser light), which are represented by slid-, dashed-, and dotted-lines, from illuminator unit 158 is directed to refractive cylinder 119 through field lens 160, as well as optical diffuser 162 that can be provided as an alternative feature. Field lens 160 can be disposed substantially at the pupil plane of the incident light to the refractive cylinder. The refractive cylinder can be disposed substantially at a focal plane of field lens 160. The light passing through the refractive cylinder is directed to collimation lens 164. The collimation lens (164) can be disposed at the pupil plane of the light existing from the refractive cylinder such that the light exiting from the refractive cylinder can be projected to infinite. The light after the collimation lens (164) is reflected by a stack of dichroic filters (e.g. 166, 168, and 170).

The stack of dichroic filters comprises a number of dichroic filters associated with the selected colors of the light from the illuminator unit (158) or, associated with the selected colors of light used in illuminating the light valve (120). Because the dichroic filters are designated to reflect the incident light of the specific colors, one or more dichroic filters in the stack can be replaced by a folding mirror. In another example, the dichroic filters can be replaced by specular- or non-specular folding mirrors with each folding mirror comprising a refractive pattern (e.g. a Bragg grating) associated with specific color light. In fact, single folding mirror having sets of refractive patterns associated with the selected light colors can be provided in place of the dichroic filters (166, 168, and 170).

The light after the collimation lens (164) is reflected by the stack of dichroic filters. Specifically, the light of the same color after the collimation lens is reflected by the same dichroic filter in the stack; light of different colors after the collimation lens (164) is reflected by different dichroic filters, as schematically illustrated in FIG. 15. The dichroic filters secures that the chief-rays of different color light are substantially constant and intercept at substantially the same plane (the pupil plane).

The reflected light from the dichroic filters is directed to relay lens 172 that is disposed substantially at the pupil of the reflected light from the dichroic filters. After the relay lens (172), the light is incident to light valve 120 such that light of different colors are telecentric. If another pupil location is preferred the position of the relay lens (172) can be adjusted accordingly. Light of each color generates an illumination field on the pixel array of the light valve as discussed above with reference to FIG. 2b through FIG. 3; and the illuminations fields of different colors are spaced apart, such as equally spaced, on the pixel array of the light valve.

The light of different colors after the refractive cylinder (119) may have far-fields that are spatially separated. The separated far-fields may not fully fill the far-field pupil at the projection lens (or for example, at the position of relay lens 172). The optical efficiency can thus be degraded. Moreover, when narrow-banded or phase-coherent light is employed for illuminating the light valve, the narrow-banded or phase-coherent light may cause unwanted diffraction, interference fringes, and/or speckle noises. The above problems can be solved by using a movable optical diffuser, such as movable optical diffuser 162. The optical diffuser can be a surface- or bulk-engineered or any other suitable optical diffusers. The movable optical diffuser can be disposed at any suitable locations along the optical path of the optical system. As an example, the optical diffuser (162) can be disposed in front of the entrance facet of refractive cylinder 134. For eliminating or reducing the above described or other related problems, the optical diffuser is capable of translational (or other forms of) movement, preferably along a direction perpendicular to the optical axis of the optical system or along any suitable directions non-parallel to the optical axis of the optical system.

Based upon the optical architecture illustrated in FIG. 15, as well as the basic parameters discussed above with reference to FIG. 5 through FIG. 13, various possible configurations of the optical system can be analyzed and compared so as to optimize the performance of the optical system. In one example, the performance of the optical system can be characterized by a merit function MF that is defined in equation 12.

$$MF(n\text{-facets}) = \text{Speed(krpm)} \times \text{mass(gr)} \times \text{diameter(mm)} \quad \text{(eq. 12)}$$

wherein Speed is the rotation speed of the refractive cylinder measured in kilo-round-per-minute (krpm); Mass is the mass of the refractive cylinder measured in Gramm (gr), and diameter is the diameter of the refractive cylinder (the diameter of the polygonal cross-section as discussed above) measured in millimeter. It will be appreciated by those skilled in the art that the Merit function in equation 12 is only one of many possible exemplary forms of merit function. In other examples, a Merit function many include other parameters, such a moment of inertia of a refractive cylinder.

Figure 16:
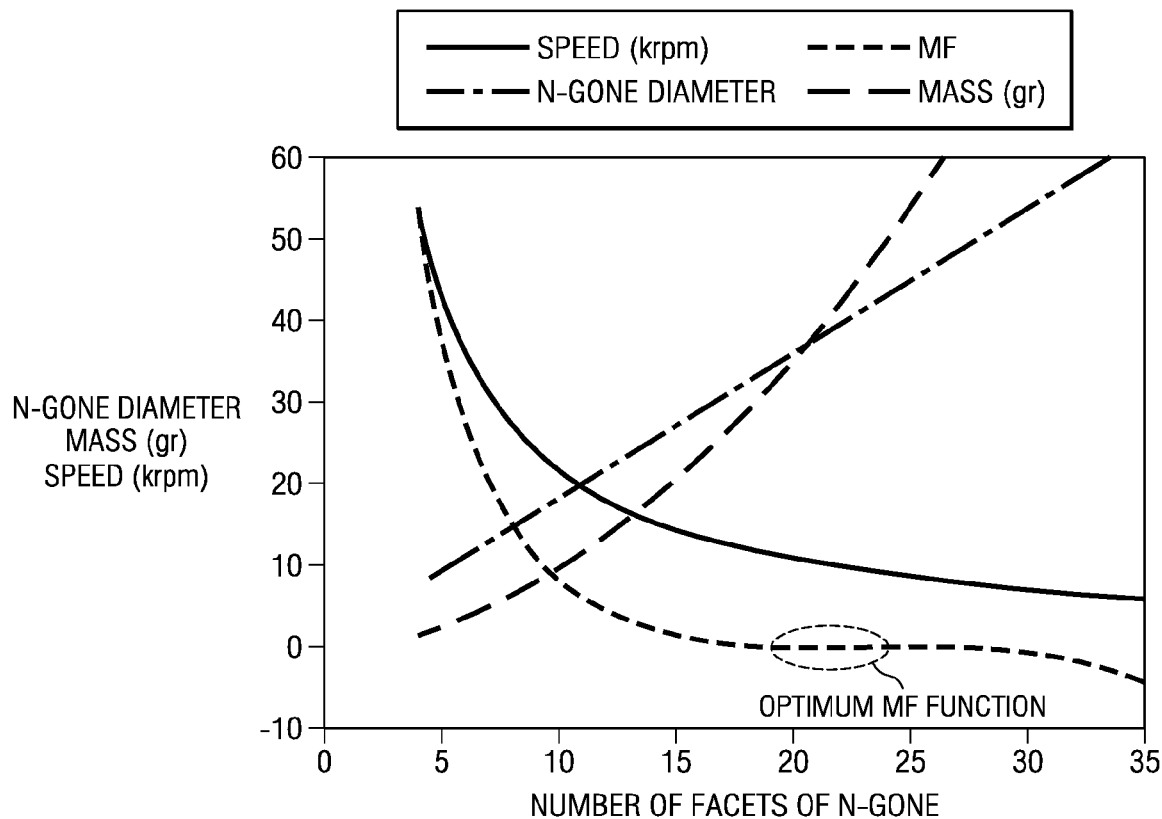
FIG. 16 is a diagram showing variations of refractive rotating parameters to different refractive polygons.

For demonstration purpose, FIG. 16 shows a diagram of relationships between speed, mass, diameter, and the number of facets of the refractive cylinder. The diagram in FIG. 16 assumes, without losing the generality, that the mass is 3.5 gr/cm$^3$; and the constraint of Speed×number offacets=216, 000. For example, the refractive cylinder may have 24 facets; and the speed is around 9 krpm.

In FIG. 16, the solid-curve represents the speed; the dashed-curve represents the MF function; the dash-and-dotted curve represents the diameter of the refractive cylinder; and the dotted-curve represents the mass. It can be seen in FIG. 16 that the MF function has a substantially "stable" or "flat" region between 18 to 24 facets. In other words, the first order local derivative of the MF function to the number of facet is substantially zero. In this region, the merit function MF is substantially constant to different numbers of facets; and other parameters of the optical architecture are adequately balanced. In an example, the optical system may have a refractive cylinder with 18 to 24 facets, 35 gr mass, 36 mm diameter, and 10 krpm rotational speed. It is noted that the above discussion is for demonstration purpose, and should not be interpreted as a limitation. Other variations within the scope of this disclosure are also applicable. For example, refractive cylinders with other suitable parameters are also applicable even though the performances of the optical architectures having the refractive cylinder may or may not be optimized.

Figure 17:
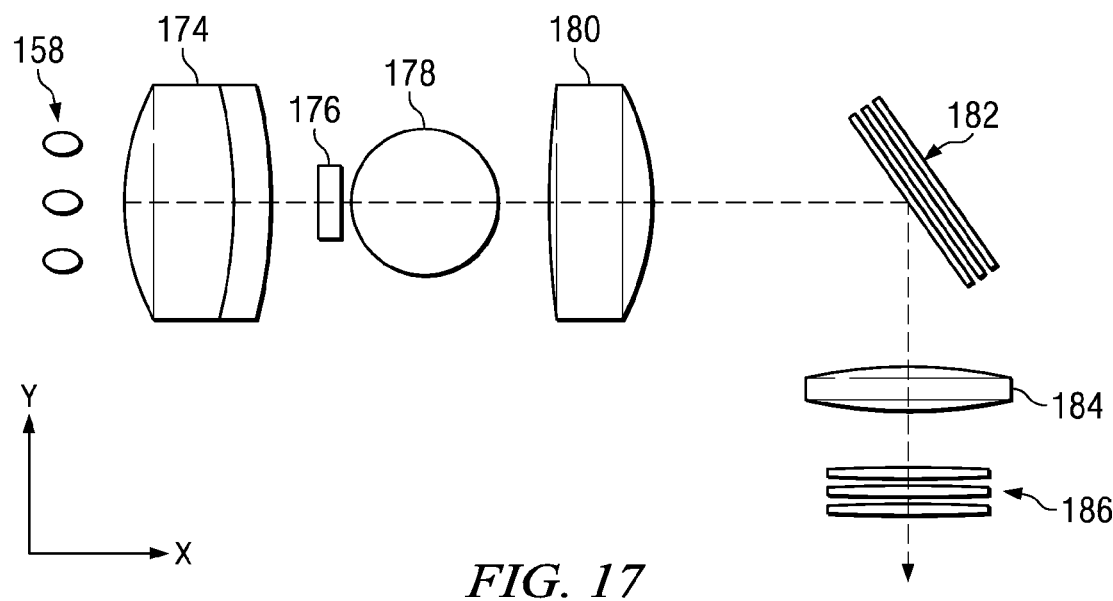
FIG. 17 schematically illustrates an exemplary optical architecture having a rotating refractive polygon capable of illuminating a light valve.
Figure 18:
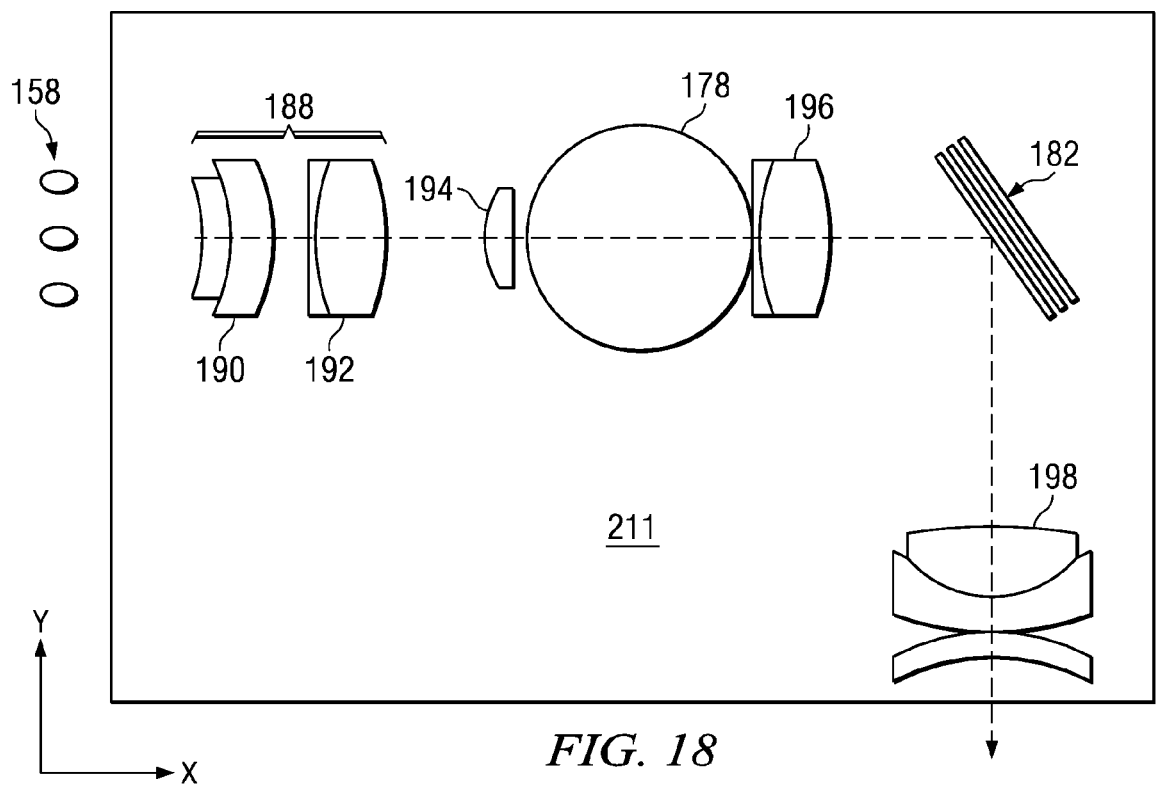
FIG. 18 schematically illustrates an exemplary optical architecture having a rotating refractive polygon capable of illuminating a light valve.

As a way of example, FIG. 17 and FIG. 18 schematically illustrate exemplary optical configurations of optical architectures having exemplary refractive cylinders as discussed above. For demonstration purpose, the refractive cylinder comprises 12 to 24 facets.

Referring to FIG. 17, illuminator unit 158 comprises illuminators for providing light of selected colors. The illuminators can be any suitable illuminators capable of emitting light, such as narrow-banded light or phase-coherent light. The colors of the light can be any suitable colors as discussed above, such as red, green, blue, yellow, cyan, magenta, white, and any desired combinations thereof.

Field lens 174 can be a single convex lens; and disposed at the optical axis between the illuminator unit (158) and refractive cylinder 178. The refractive cylinder (178) can be one of the exemplary refractive cylinders discussed above or one of the refractive cylinders within the scope of this disclosure. In particular, the refractive cylinder can be refractive cylinder 119 as discussed above. As an alternative feature, optical diffuser, which can be a surface-engineered optical diffuser, a bulk-engineered optical diffuser, or any other suitable optical diffusers, is disposed at the optical axis and between field lens 174 and refractive cylinder 178. Other uniformization techniques, such as cylindrical lenslet array in a fly eyes configuration can also be applied.

Collimation lens 180 is disposed at the optical axis and after refractive cylinder 178, such as at a location proximate to the exit facet of refractive cylinder 178. A stack of dichroic filters 182 is disposed at the optical axis and after the collimation lens (180). As discussed above, the stack of dichroic filters comprises dichroic filters associated with light of the selected colors (wavelengths). In other examples, one or more dichroic filters can be replaced by a specular- or a non-specular folding mirror. Alternatively, the stack of dichroic filters can be replaced by multiple refractive patterns (e.g. Bragg gratings) that may be formed on single substrate or multiple substrates.

Relay lens 184 can be provided in association with the collimation lens and the stack of dichroic filters (or equivalences) to accomplish desired far-field of the light after the refractive cylinder. Relay lens 184 can be disposed substantially at the pupil of the light after the stack of dichroic filters.

Projection lens 186 is provided for projecting the light onto the light valve so as to generate the desired illumination fields on the light valve.

Other optical components may also be provided. For example, a beam-shaping unit can be disposed at the optical axis for modifying the light to obtain illumination fields with desired profiles on the light valve. Exemplary beam-shaping units are set forth in U.S. patent application "An Optical Architecture" to Grasser, attorney docket number TI-65027, filed on the same day as this application; and the subject matter of which is incorporated herein by reference in its entirety.

The optical architecture in FIG. 17 may have a length (along the X direction) from 50 to 300 mm, such as around 110 mm; a height (along the Y-direction) from 10 to 200 mm, such as around 40 mm; and a width (along the Z direction) from 40 to 200 mm, such as around 80 mm. The optical architecture may have other suitable dimensions. The optical architecture can be configured to have any suitable f-numbers, such as from 1.8 to 5.4, and around 3.8. The geometric coupling of the components in the optical architecture can be 85% or more, such as 90% or more, or 95% or more. The refractive cylinder (178) in this example may comprise any suitable transmissive materials, such as SF56 and SF66 or sf57 and sf6. The refractive cylinder may have a diameter of from 20 to 80 mm, and more preferably around 30 mm. Other values are also applicable. The mass of the refractive cylinder can be from 20 to 100 gr, and more preferably around 20 gr. In operation, the refractive cylinder can be rotated along the major axis at a speed of from 1 to 20 krpm, such as around 9 krpm. The scanning non-linearity of the generated light scanning the light valve can be around 1.6% or less but could be as high as 10% without severe problem Another exemplary optical architecture is schematically illustrated in FIG. 18. In this example, illuminator unit 158 comprises illuminators for providing desired illumination light for the system. Illuminator unit 158 may have the same configuration as that in FIG. 17. Meniscus lens 190 and convex lens 192 form field lens assembly 188 between the illuminator unit (158) and refractive cylinder 178. The field lens (188) is provided for condensing the light from the illuminators to the facets the refractive cylinder; while capable of correcting geometric and/or chromatic aberrations. Another field lens 194 is disposed at a position proximate to the entrance facet of the refractive cylinder. Field lens 194 can be the same as the field lens (156) discussed above with reference to FIG. 14 for imaging the pupil of the incident light onto the exiting facet of the refractive cylinder. Collimation lens 196, which may have the same configuration as the collimation lens 180 in FIG. 17, is disposed on the optical axis and at a location proximate to the exit facet of the refractive cylinder. The light after the collimation lens 196 is directed to projection lens 198 through a stack of dichroic filters 182. The projection lens projects the light onto the light valve so as to generate illumination color fields on the pixel array of the light valve. By rotating the refractive cylinder, the generated color fields on the light valve pixel array can then be moved across the pixel array of the light valve so as to accomplish sequential illumination.

The optical architecture in FIG. 18 may have a length (along the X direction) from 20 to 150 mm, such as around 7 mm; a height (along the Y direction) from 5 to 100 mm, such as around 25 mm; and a width (along the Z direction) from 20 to 200 mm, such as around 51 mm. The optical architecture may have other suitable dimensions. The optical architecture can be configured to have any suitable f-numbers, such as from 1.1 to 5.4, and around 1.9. The geometric coupling of the components in the optical architecture can be 85% or more, such as 90% or more, or 95% or more. The refractive cylinder (178) in this example may comprise any suitable transmissive materials, such as moldable SF56 and moldable SF66. The refractive cylinder may have a diameter of from 10 to 80 mm, and more preferably around 21 mm. Other values are also applicable. The mass of the refractive cylinder can be from 5 to 100 gr, and more preferably around 12.7 gr. In operation, the refractive cylinder can be rotated along the major axis at a speed of from 5 to 40 krpm, such as around 18 krpm. The scanning non-linearity of the generated light scanning the light valve can be around 6.4% or less.

Figure 19B:
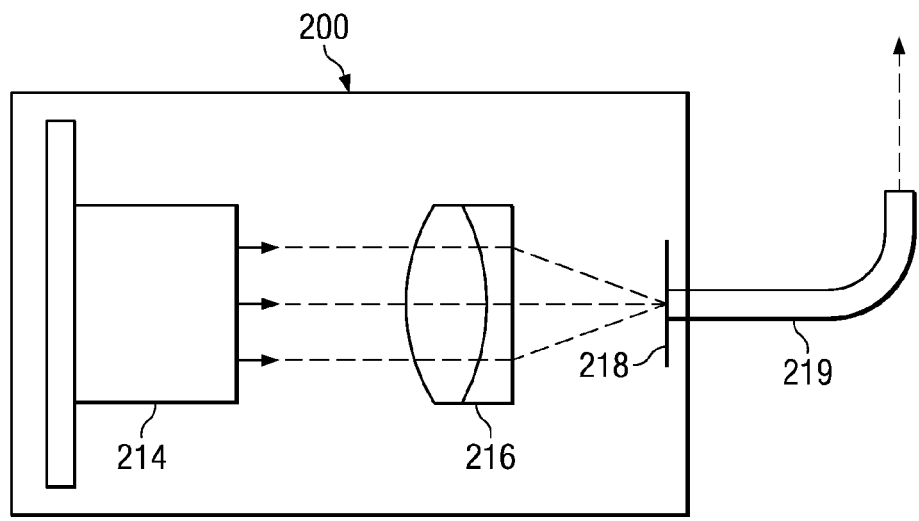

The optical architectures as illustrated in FIG. 17 and FIG. 18 are two of many possible examples; and each can be implemented in a display system in many ways. As an example, FIG. 19a and FIG. 19b schematically illustrate an exemplary system having an illumination system and the optical architecture that is illustrated in FIG. 18.

Figure 19A:
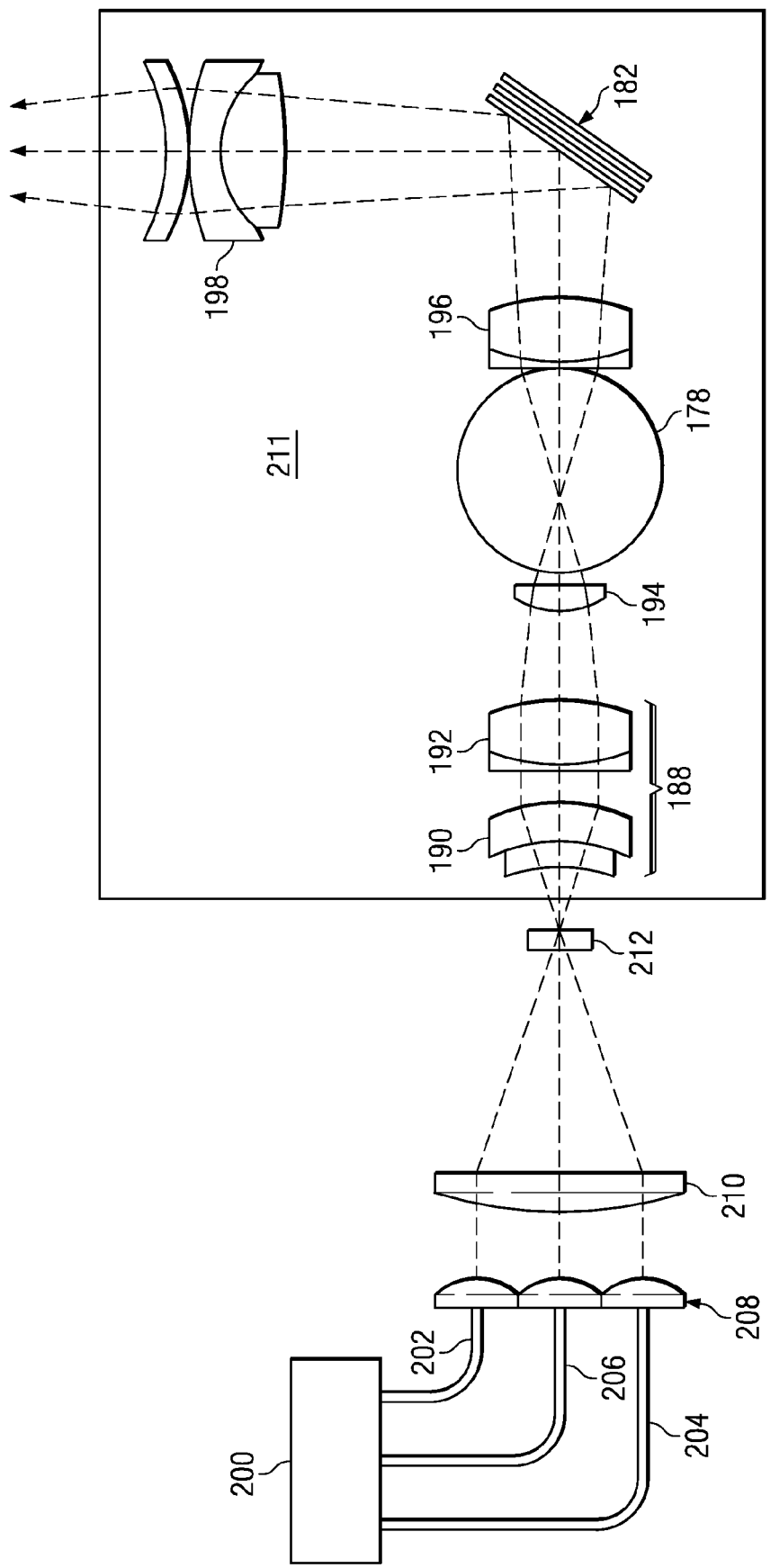
FIG. 19a schematically illustrates an exemplary optical system employing the optical architecture of FIG. 18 for use in an imaging system that employs a light valve having an array of individually addressable pixels.

Referring to FIG. 19a, field lens assembly 188 (comprising lenses 190 and 192), field lens 194, refractive cylinder 178, collimation lens 180, dichroic filter stack 182, and projection lens 198 together form an optical structure 211 as discussed above with reference to FIG. 18, which will not be repeated herein.

Illumination system 200 provides desired light for the system; and can be implemented in many possible ways. An exemplary implementation of illumination system 200 is schematically illustrated in FIG. 19b Referring to FIG. 19b, the illumination system comprises illuminator unit 214 that can be the same as illuminator unit 158 as discussed above with reference to FIG. 17 and FIG. 18. The illuminator unit is capable of providing light of selected colors. The light from illuminator unit 214 passes through condensing lens 216. Condensing lens 216 converges the light onto the entrance of optical cable 219. As an alternative feature, aperture 218 can be placed at the entrance of the optical cable.

Referring back to FIG. 19a, the light from illumination system 200 is dispatched to optical cables 202, 204, and 206 such that each cable delivers light of substantially all selected colors. For example, each optical cable delivers red, green, and blue light from the illumination system. Because the illuminators emitting light of different colors can be arranged in separate lines as discussed above with reference to FIG. 1 and FIG. 2a, the light of different colors traveling inside each cable have individual propagation paths. When the light are fed into the optical system (e.g. into fly-eye lens 208, the light of the same color has substantially the same incident angle; while light of different colors has different incident angles. In this way, light of different colors is not mixed or overlapped. Other light delivery means are also applicable. For example, each optical cable can be designated to deliver light of substantially the same color; while light of different colors can be delivered with separate optical cables.

The light from the optical cables 202, 204, and 206 are fed into separate lenslets (or separate lenslets groups) of fly-eye lens 208 as illustrated in FIG. 29a. For example, the outlet of each optical cable can be aligned to one or a group of lenslets of fly-eye lens 208; and outlets of different optical cables can be aligned to different lenslet or different groups of lenslets of the fly-eye lens. It is preferred, though not required, that the outlets of the optical cables are uniformly deployed around the optical axis of the system (e.g. around the optical center of fly-eye lens. With this configuration, the chief-ray of one of the color light is substantially coincident to the optical axis of the optical system; while the chief-rays of other color light can be uniformly distributed around the optical axis of the optical system.

The fly-eye lens (208) can be a unidirectional fly-eye lens or a bi-directional fly-eye lens for modifying the incident light into modified light with the desired profile (e.g. shape of the illumination field and the intensity distribution), as set forth in U.S. patent application "An Optical Architecture" to Grasser, attorney docket number TI-65027, the subject matter being incorporated herein by reference in its entirety.

The light passing through the fly-eye lens (208) is directed to field lens 210 that converges the light onto a focal plane of field lens 210. Optical diffuser 212, which can be the same as optical diffuser 176 in FIG. 17, can be alternatively disposed at, or proximately at the focal plane on which the light is converged by lens 210. The converged light after lens 210 (and optical diffuser 212 if provided) at the focal plane can be treated as a point source that illuminates light of desired colors.

The light is then directed to optical architecture 211 that passes the light in a way as discussed above with reference to FIG. 18, which will not be repeated herein. The light after the optical architecture (211) can then be directed to the light valve to sequentially illuminating the pixel array of the light valve by rotating the refractive cylinder (178).

With the above optical architecture, the illumination light of different colors from the illuminators can be projected to the light valve simultaneously, which in turn allows for the illuminators being operated continuously. Because all light from the illuminators can arrive at the screen simultaneously with substantially no light being blocked, the brightness of the produced images on the screen can be significantly larger than that in existing display systems wherein light of different colors are sequentially incident to the light valve and only one color light is incident to the light valve at a time.

Figure 20:
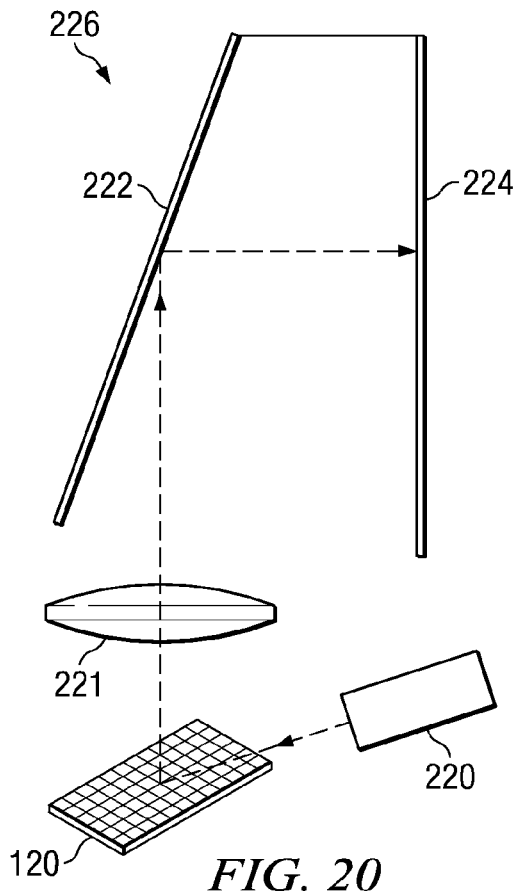
FIG. 20 schematically illustrates an exemplary rear-projector in which examples of optical architectures of this disclosure can be implemented.

As a way of example, FIG. 20 schematically illustrates an exemplary rear-projection system, such as a rear-projection TV that employs an optical architecture as discussed above. It is noted that the optical architecture discussed above is also applicable to many other imaging systems, such as front-projectors.

Referring to FIG. 20, the rear-projection system (226) comprises optical system 220 for illuminating light valve 120 with desired light. The optical system (220) can be the same as that discussed above with reference to FIG. 19a or any suitable optical structures/architectures with a refractive cylinder as discussed above. The illumination light from the optical system 220 is incident to light valve 120 and sequentially illuminates the pixels of the light valve by rotating the refractive cylinder of the optical system 220. The light valve pixels modulate the incident light according to image data (e.g. bitplane data) derived from the desired image to be produced. The modulated light is then directed to a folding mirror (222) through optical element 221 that spreads the modulated light from the light valve across the reflecting area of the folding mirror (222). The folding mirror projects the modulated light onto a translucent screen (224) so as to present the desired image on the translucent screen.

Figure 21:
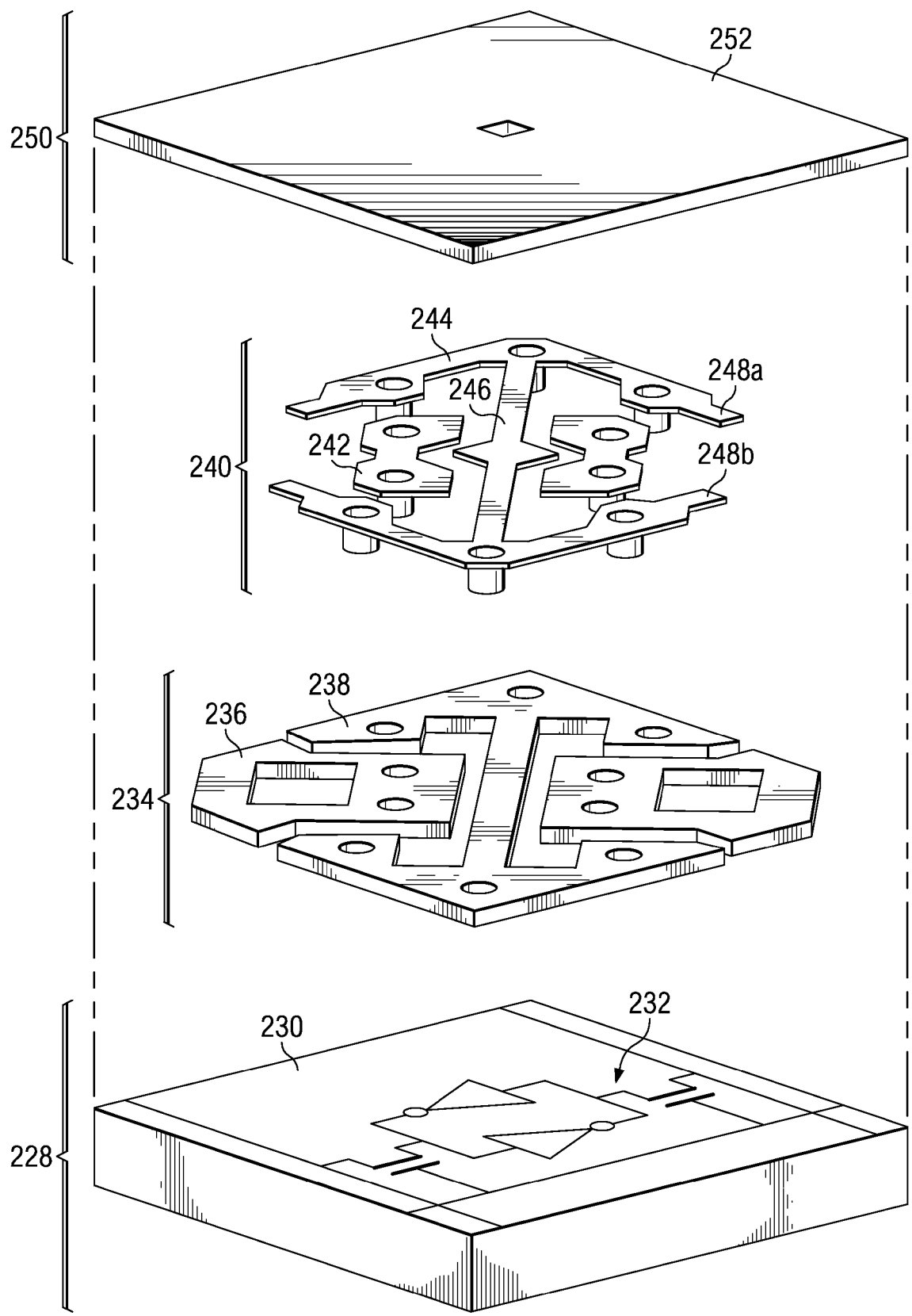
FIG. 21 schematically illustrates an exemplary micromirror device that can be used in the light valve of the display system in FIG. 1.

As discussed above, the light valve may comprise any suitable type of pixels, one of which is reflective and deflectable micromirror devices. FIG. 21 schematically illustrates an exemplary reflective and deflectable micromirror device.

Referring to FIG. 21, the micromirror device comprises substrate layer 228 in which substrate 230 is provided. Substrate 230 can be any suitable substrates, such as semiconductor substrates, on which electronic circuits (e.g. circuits 232) can be formed for controlling the state of the micromirror device.

Formed on substrate layer 228 can be electrode pad layer 234 that comprises electrode pad 236 and other features, such as electronic connection pad 238 that electrically connects the underlying electronic circuits to the above deformable hinge and mirror plate. Hinge layer 240 is formed on the electrode pad layer (236). The hinge layer comprises deformable hinge 246 (e.g. a torsion hinge) held by hinge arm 244 that is supported above the substrate by hinge arm posts. Raised addressing electrodes, such as electrode 242 is formed in the hinge layer (240) for electrostatically deflecting the above mirror plate. Other features, such as stopper 248a and 248b each being a spring tip, can be formed in the hinge layer (240). Mirror plate layer 250, which comprises reflective mirror plate 252 attached to the deformable hinge by a mirror post, is formed on the hinge layer (240).

FIG. 21 schematically illustrates one of many possible micromirror devices. In other examples, the micromirror device may comprise a light transmissive substrate, such as glass, quartz, and sapphire, and a semiconductor substrate formed thereon an electronic circuit. The light transmissive substrate and the semiconductor substrate are disposed proximate to each other leaving a vertical gap therebetween. A reflective mirror plate is formed and disposed within the gap between the light transmissive and semiconductor substrates. In another example, the reflective mirror plate can be in the same plane of the light transmissive substrate and derived from the light transmissive substrate.

Figure 22:
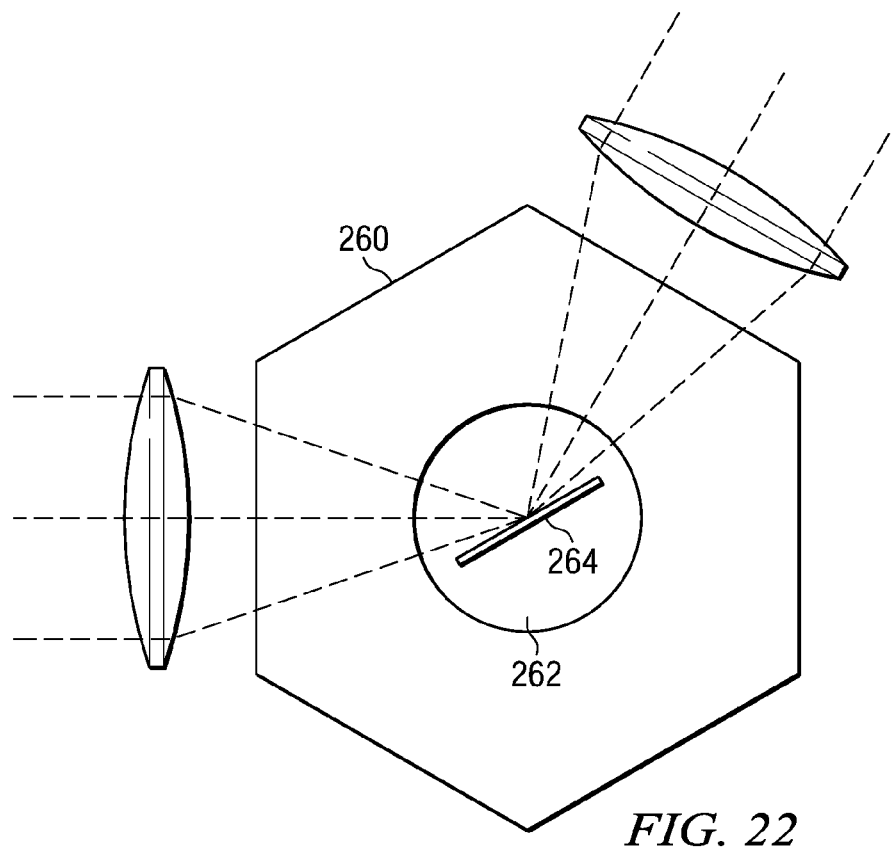
FIG. 22 schematically illustrates another exemplary refractive cylinder with a vacant region.

It will be appreciated by those skilled in the art that the above discussion is for demonstration purpose, and should not be interpreted as a limitation. Many other variations within the scope of this disclosure are also applicable. For example, the refractive cylinders as discussed above may have cross-sections that are substantially regular. In other examples, refractive cylinders with non-regular polygonal cross-sections are also applicable. Refractive cylinders may have solid-bodies. Alternatively, refractive cylinders may have vacant regions inside bodies, an example of which is schematically illustrated in FIG. 22. In this example, refractive cylinder 260 comprises vacant region (hollow region) 262. The vacant region in this example takes a circular shape originated around the major axis of refractive cylinder 160. The vacant region may take any other suitable shapes, such as polygon. A refractive mirror plate (264), which can be a specular- or non-specular refractive mirror, is disposed in the vacant region such that the incident light entering into the refractive cylinder from the entrance facet can be reflected onto the exit facet of the refractive cylinder. As an example, the reflective mirror plate can be disposed around the major axis of the refractive cylinder.

It will be appreciated by those of skill in the art that a new and useful optical architecture having an optical scanning mechanism for causing an illumination field on a target and moving the illumination field across the target has been described herein. In view of the many possible embodiments, however, it should be recognized that the embodiments described herein with respect to the drawing figures are meant to be illustrative only and should not be taken as limiting the scope of what is claimed. Those of skill in the art will recognize that the illustrated embodiments can be modified in arrangement and detail. Therefore, the devices and methods as described herein contemplate all such embodiments as may come within the scope of the following claims and equivalents thereof.

I claim:

1. An optical system for use in illuminating a light valve of a display system, the optical system comprising:
    an illumination unit comprising a set of illuminators for providing light;
    a refractive cylinder having a substantially constant polygonal cross-section perpendicular to a major axis of the refractive cylinder;
    wherein the refractive cylinder is attached to a moving mechanism such that the cylinder is capable of rotating relative to the light;
    a field lens disposed between the illumination unit and the refractive cylinder;
    a collimation lens disposed after the refractive cylinder on an optical axis of the optical system; and
    a stack of dichroic filters on the optical axis of the optical system and after the collimation lens along a propagation path of the light.

2. The system of claim 1, wherein the field lens is disposed at a position proximate to a facet of the refractive cylinder or at a location such that a facet of the refractive cylinder is substantially at a focal plane of the field lens.

3. The system of claim 1, wherein the refractive cylinder comprises an optical material with a refractive index that is determined by a number of facets of the polygonal cross-section of the refractive cylinder.

4. The system of claim 1, wherein the refractive cylinder has a refractive index of 1.6 or lower; and the polygonal cross-section has 6 or less facets.

5. The system of claim 1, wherein the refractive cylinder has a refractive index of 1.9 or higher; and the polygonal cross-section has 12 or more facets.

6. The system of claim 1, wherein a pupil of the light from the illumination unit is substantially coincident to an exit facet of the refractive cylinder at or during a time period, wherein the exit facet is a facet from which the light exit from the refractive cylinder.

7. The system of claim 1, wherein the illuminators are laser sources.

8. The system of claim 1, wherein the polygonal cross-section comprises a number of facets; and each facet has a width substantially equal to a size of an illumination area caused by light from the illuminator unit.

9. An optical system for illuminating an array of individually addressable pixels in a light valve of a display system, the optical system comprising:
    an illumination unit comprising a set of illuminators for providing light;
    a refractive cylinder having a substantially constant polygonal cross-section perpendicular to a major axis of the refractive cylinder;
    a collimation lens disposed after the refractive cylinder on an optical axis of the optical system; and
    a stack of dichroic filters on the optical axis of the optical system and after the collimation lens;
    wherein the refractive cylinder is attached to a moving mechanism such that the cylinder is capable of rotating relative to the light; and
    wherein the light from the illuminator unit is optically coupled to the refractive cylinder such that a pupil of the light from the illuminator unit has an image substantially at an exit facet of the refractive cylinder, wherein the exit facet is a facet through which the light exits from the refractive cylinder after passing through the refractive cylinder.

10. The system of claim 9, further comprising: a field lens disposed between the illumination unit and the refractive cylinder.

11. The system of claim 10, wherein the field lens is disposed at a position proximate to a facet of the refractive cylinder or at a location such that a facet of the refractive cylinder is substantially at a focal plane of the field lens.

12. The system of claim 9, wherein the refractive cylinder has a refractive index of 1.6 or lower; and the polygonal cross-section has 6 or less facets.

13. The system of claim 9, wherein the refractive cylinder has a refractive index is 1.9 or higher; and the polygonal cross-section has 12 or more facets.

14. The system of claim 9, wherein a pupil of the light from the illumination unit is substantially coincident to an exit facet of the refractive cylinder at or during a time period, wherein the exit facet is a facet from which the light exit from the refractive cylinder.

15. An optical system for use in illuminating a light valve of a display system, the optical system comprising:
    an illumination unit comprising a set of illuminators for providing light;
    a refractive cylinder having a substantially constant polygonal cross-section perpendicular to a major axis of the refractive cylinder;
    wherein the refractive cylinder is attached to a moving mechanism such that the cylinder is capable of rotating relative to the light;
    a collimation lens disposed at an optical axis of the optical system and after the refractive cylinder; and
    a stack of dichroic filters on the optical axis of the optical system and after the collimation lens.

16. The system of claim 15, further comprising:
    a relay lens disposed on the optical axis and after the stack of dichroic filters; and
    a field lens disposed between the illumination unit and the refractive cylinder.

* * * * *